(12) United States Patent
Sekiyama

(10) Patent No.: US 7,009,782 B2
(45) Date of Patent: Mar. 7, 2006

(54) IMAGING OPTICAL SYSTEM AND IMAGING APPARATUS USING THE SAME

(75) Inventor: Kentaro Sekiyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/813,636

(22) Filed: Mar. 31, 2004

(65) Prior Publication Data
US 2004/0240078 A1 Dec. 2, 2004

(30) Foreign Application Priority Data
Apr. 4, 2003 (JP) .............................. 2003-101276

(51) Int. Cl.
*G02B 17/00* (2006.01)
*G02B 15/14* (2006.01)
(52) U.S. Cl. ...................................... 359/726; 359/680
(58) Field of Classification Search ................ 359/726, 359/733, 736, 755, 763, 770, 846, 680–684, 359/672, 675
See application file for complete search history.

(56) References Cited

U.S. PATENT DOCUMENTS

| 6,464,363 B1 | 10/2002 | Nishioka et al. |
| 2002/0041445 A1 | 4/2002 | Nishioka et al. |
| 2003/0160902 A1 * | 8/2003 | Mihara et al. .............. 359/432 |

* cited by examiner

*Primary Examiner*—Georgia Epps
*Assistant Examiner*—Alicia M Harrington
(74) *Attorney, Agent, or Firm*—Pillsbury Winthrop Shaw Pittman LLP

(57) ABSTRACT

An imaging optical system includes a first lens unit located at the most object-side position and at least one of lens units interposed between the first lens unit and an image. At least one of the lens units is moved along the optical axis. The first lens unit includes, in order from the object side, at least one lens with negative refracting power, a deformable mirror, and at least one lens with positive refracting power, and focusing is performed by the deformation of the deformable mirror.

5 Claims, 21 Drawing Sheets

WIDE

STND.

TELE.

IMAGING OPTICAL SYSTEM AND IMAGING APPARATUS USING THE SAME

BACKGROUND OF THE INVENTION

1. Field of the Invention

This invention relates to an imaging optical system and an electronic imaging apparatus provided with the imaging optical system.

2. Description of Related Art

In an imaging apparatus, when focusing is performed in accordance with the object distance of an object to be photographed, a conventional imaging optical system has been required to move at least one lens along the optical axis. In this case, the movement of the lens is made, for example, by a stepping motor.

Instead of moving the lens, a variable optical-property mirror can be used (refer to, for example, Japanese Patent Kokai No. 2002-287033).

In order to downsize the optical system, the optical system can be designed so that an optical element is decentered and placed or the optical path is bent (refer to, for example, Japanese Patent Kokai Nos. 2000-298237 and 2003-043354).

SUMMARY OF THE INVENTION

The imaging optical system of the present invention is adapted to form an image of an object, and comprises a lens unit G1 located at the most object-side position and at least one of lens units interposed between the lens unit G1 and the image. At least one of the lens units is moved along the optical axis. The lens unit G1 includes, in order from the object side, at least one lens with negative refracting power, a deformable mirror, and at least one lens with positive refracting power, and focusing is performed by the deformation of the deformable mirror.

At least one optical surface constituting the imaging optical system is shift-decentered in a direction nearly perpendicular to an axial chief ray to satisfy the following condition:

$$|\delta/fw| < 1.0$$

where $\delta$ is the amount of shift decentration of the optical surface and fw is the focal length of the imaging optical system at a wide-angle position.

At least one optical surface constituting the imaging optical system is tilt-decentered, with an axis nearly perpendicular to an axial chief ray as a center, to satisfy the following condition:

$$|\epsilon| < 5.0 (\text{deg})$$

where $\epsilon$ (deg) is the amount of tilt decentration of the optical surface.

Further, the imaging optical system of the present invention comprises, in order from the object side, a lens unit G1 with negative refracting power, a lens unit G2 with positive refracting power, a lens unit G3 with negative refracting power, a lens unit G4 with positive refracting power, and a lens unit G5. In this case, each of the lens unit G2 and the lens unit G4 is moved independently along the optical axis to satisfy one of the following conditions:

$$0.1 < fG2/fw$$

$$0.1 < fG4/fw$$

where fG2 is the focal length of the lens unit G2 and fG4 is the focal length of the lens unit G4.

Sill further, the imaging optical system of the present invention has at least one lens unit moved along the optical axis when the magnification of the optical system is changed. The lens unit includes at least two relatively decentered lenses.

The imaging apparatus of the present invention includes the imaging optical system mentioned above and an image sensor.

According to the present invention, an optical system that is small in the number of moving lens units, compact in design, low in power consumption, and noiseless in operation, and an imaging apparatus using the optical system can be provided.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
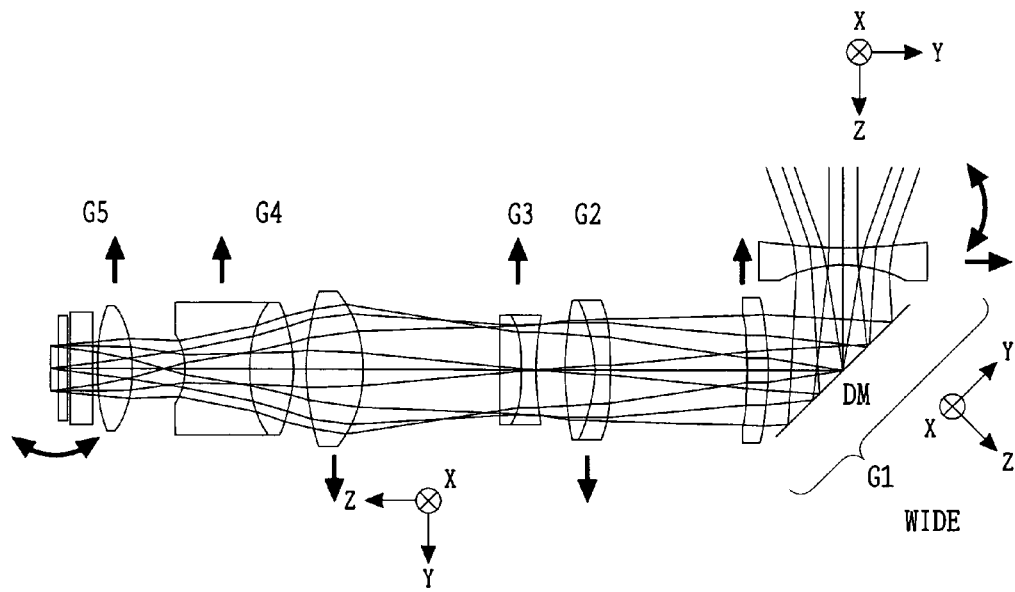
FIGS. 1A, 1B, and 1C are Y-Z sectional views showing optical arrangements at wide-angle, standard, and telephoto positions, respectively, of the optical system of a first embodiment in the present invention.

The imaging optical system of the present invention and the imaging apparatus using this imaging optical system will be described below.

The imaging optical system of the present invention has the lens unit G1 located at the most object-side position, and lens units are interposed between the lens unit G1 and the image plane. At least one of these lens units is moved independently along the optical axis and thereby the magnification change of the optical system is carried out. The lens unit G1 includes, in order from the object side, at least one lens with negative refracting power, the deformable mirror, and at least one lens with positive refracting power.

In the imaging optical system, focusing is performed by the deformation of the deformable mirror. As such, the negative lens is placed on the object side of the deformable mirror. This lens has stronger negative power than in an ordinary imaging optical system that has a negative lens at the most object-side position. When the strong negative power is imparted to this negative lens, an optical system located on the image side of the deformable mirror is to have strong positive power in order to form an image. As a result, the imaging magnification of the optical system located on the image side of the deformable mirror can be increased. If the magnification of the optical system located on the image side of the deformable mirror is low, the amount of deformation of the deformable mirror required for focusing will be increased. Consequently, the amount of production of aberration becomes remarkable. However, when the optical system is constructed as mentioned above, the amount of deformation of the deformable mirror required for focusing can be reduced.

However, when the power of the negative lens is strengthened, the power of the lens unit G1 becomes strong. As a result, there is the fear of suffering deterioration in performance due to the decentration error of the lens unit G1. Thus, the power of the negative lens is strengthened by placing the positive lens on the image side of the deformable mirror, and at the same time, the reasonability of the power of the entire lens unit G1 is effected. As described above, by arranging at least one negative lens and at least one positive lens with the deformable mirror between them, deterioration in performance due to the decentration error of the lens unit G1 is kept to a minimum.

In the imaging optical system, it is desirable to have lens units arranged adjacent to the object side and the image side of the deformable mirror and to satisfy one of the following conditions:

$$0.1 < d1/fw < 10.0 \tag{1-1}$$

$$0.1 < d2/fw < 10.0 \tag{1-2}$$

where d1 is a distance between a lens unit placed adjacent to the object side and the deformable mirror, d2 is a distance between a lens unit placed adjacent to the image side and the deformable mirror, and fw is the focal length of the imaging optical system at a wide-angle position.

Also, the focal length mentioned above is defined as the one in a state where the deformable mirror is flat. This also holds for the description given below. The distance mentioned above refers to the one from a lens surface closest to the deformable mirror to the deformable mirror.

Beyond the upper limit of Condition (1-1) or (1-2), the size of the imaging optical system becomes bulky. In addition, the area of the reflecting surface of the deformable mirror must be increased, and thus the control of a surface profile and the fabrication of the deformable mirror itself become difficult.

Below the lower limit of Condition (1-1) or (1-2), the distance between the deformable mirror and each of the lens units located before and behind the deformable mirror becomes too short. Consequently, the placement of each lens unit becomes difficult.

Specifically, the lens unit is constructed with either a single lens or a plurality of lenses.

In the imaging optical system, it is desirable to satisfy the following condition:

$$0.2 < |fG1/fw| \tag{3-1}$$

where fG1 is the focal length of the lens unit G1.

The imaging optical system satisfies Condition (3-1) and thereby the power of the lens unit G1 can be kept within a proper limit. This result shows that even though there is the decentration error in the lens unit G1, deterioration in performance can be suppressed.

Instead of satisfying Condition (3-1), it is further desirable to satisfy the following condition:

$$0.5 < |fG1/fw| \tag{3-2}$$

When the imaging optical system satisfies this condition, a lower sensitivity of the lens unit G1 to the decentration error is obtained. In Conditions (3-1) and (3-2), it is desirable that the value of the upper limit is less than 50.

In the imaging optical system, it is desirable that at least one moving lens unit satisfies the following condition:

$$0.1 < |fGm/fw| \tag{4-1}$$

where fGm is the focal length of the moving lens unit.

By satisfying Condition (4-1), the power of the moving lens unit in the magnification change of the optical system can be kept within a proper limit. Consequently, even though there is the decentration error in the lens unit G1, deterioration in performance can be suppressed.

Instead of satisfying Condition (4-1), it is further desirable to satisfy the following condition:

$$0.25 < |fGm/fw| \tag{4-2}$$

When the imaging optical system satisfies this condition, a lower sensitivity to the decentration error is obtained. In Conditions (4-1) and (4-2), it is desirable that the value of the upper limit is less than 100.

In the imaging optical system, it is desirable that the lens unit G1 has a lens unit G1p located on the image side of the deformable mirror and satisfies the following condition:

$$0.1<|fG1p/fw| \tag{5-1}$$

where fG1p is the focal length of the lens unit G1p.

By satisfying Condition (5-1), deterioration in optical performance can be suppressed even when there is the decentration error in any lens (optical element) of the imaging optical system.

Instead of satisfying Condition (5-1), it is further desirable to satisfy the following condition:

$$0.2<|fG1p/fw| \tag{5-2}$$

When the optical system satisfies this condition, deterioration in performance due to the decentration error can be further lessened. In Conditions (5-1) and (5-2), it is desirable that the value of the upper limit is less than 200.

In the imaging optical system, it is desirable that the shape of the deformable mirror can be changed within a preset limit to satisfy one of the following conditions in one state within the preset limit:

$$|C_4 \times fw|<0.2 \tag{6-1}$$

$$|C_6 \times fw|<0.2 \tag{6-2}$$

where $C_4$ is a coefficient in the term of $X^2$ where the profile of the reflecting surface of the deformable mirror is expressed by a polynomial of X and Y and $C_6$ is a coefficient in the term of $Y^2$ of this polynomial.

By satisfying Condition (6-1) or (6-2), variation in the focal length of the deformable mirror can be kept in a proper limit. As a result, the amount of aberration produced in the deformable mirror can be reduced.

Instead of satisfying Conditions (6-1) and (6-2), it is further desirable to satisfy the following conditions:

$$|C_4 \times fw|<0.05 \tag{6-3}$$

$$|C_6 \times fw|<0.05 \tag{6-4}$$

When the optical system satisfies one of the above conditions, the amount of aberration produced in the deformable mirror can be further reduced. In Conditions (6-1), (6-2), (6-3), and (6-4), it is desirable that the value of the upper limit is larger than zero.

In the imaging optical system, it is desirable that the deformable mirror is placed so as to satisfy the following condition:

$$35°<\theta<105° \tag{7-1}$$

where θ is the sum of an angle of incidence of an axial chief ray on the deformable mirror and an angle of emergence of the axial chief ray from the deformable mirror.

Also, the axial chief ray refers to a ray that emanates from the center of the object, passes through the center of the stop, and reaches the center of the image. This also holds for the description given below.

The angle of incidence signifies an angle made by the normal line of the surface of the deformable mirror with the axial chief ray incident on the deformable mirror. The angle of emergence signifies an angle made by the normal line of the surface of the deformable mirror with the axial chief ray emerging from the deformable mirror. Here, the surface of the deformable mirror is assumed to be flat. The angle θ can also be thought of as an angle at which the axial chief ray is bent by the deformable mirror.

Beyond the upper limit of Condition (7-1), the axial chief ray is liable to enter the deformable mirror at an extreme grazing angle. Thus, aberration produced in the deformable mirror is increased. Furthermore, since the size of the deformable mirror is enlarged in a longitudinal direction, a cost reduction becomes difficult.

Below the lower limit of Condition (7-1), the size of the deformable mirror is reduced. However, the optical elements located before and behind the deformable mirror mechanically interfere with each other, and hence the placement of each of the optical elements becomes difficult.

Instead of satisfying Condition (7-1), it is further desirable to satisfy the following condition:

$$75°<\theta<105° \tag{7-2}$$

In the imaging optical system, it is favorable that at least one optical surface constituting the imaging optical system is shift-decentered in a direction nearly perpendicular to the axial chief ray to satisfy the following condition:

$$|\delta/fw|<1.0 \tag{8-1}$$

where δ is the amount of shift decentration of the optical surface.

The imaging optical system is constructed with optical surfaces or lenses. When at least one optical surface or lens is shifted in a direction nearly perpendicular to the axial chief ray, aberration produced in the deformable mirror can be canceled.

By satisfying Condition (8-1), the amount of shift of the optical surface or the lens is kept in a proper limit and at the same time, aberration produced in the deformable mirror can be canceled. In Condition (8-1), it is desirable that the value of the lower limit is larger than zero.

In the imaging optical system, it is favorable that at least one optical surface constituting the imaging optical system is tilt-decentered, with an axis nearly perpendicular to the axial chief ray as a center, to satisfy the following condition:

$$|\epsilon|<5.0 \text{ (deg)} \tag{9-1}$$

where ε (deg) is the amount of tilt decentration of the optical surface.

The imaging optical system, as mentioned above, is constructed with optical surfaces or lenses. Thus, at least one optical surface or lens is tilted, with an axis nearly perpendicular to the axial chief ray as a center, and thereby aberration produced in the deformable mirror can be canceled.

By satisfying Condition (9-1), the amount of tilt of the lens or the imaging surface is kept in a proper limit and at the same time, aberration produced in the deformable mirror can be canceled.

Instead of satisfying Condition (9-1), it is further favorable to satisfy the following condition:

$$|\epsilon|<2.0 \tag{9-2}$$

In Conditions (9-1) and (9-2), it is desirable that the value of the lower limit is larger than zero.

In the imaging optical system, the lens unit G1 has negative refracting power, and as the lens units interposed between the lens unit G1 and the image, the lens unit G2 with positive refracting power, the lens unit G3 with negative refracting power, the lens unit G4 with positive refracting power, and the lens unit G5 are arranged. The lens units moved along the optical axis are the lens unit G2 and the lens unit G4, each of which is preferably moved independently.

In the imaging optical system, it is desirable that each of the lens units moved along the optical axis includes at least two relatively decentered lenses.

By decentering and arranging the lenses, aberration produced in the deformable mirror can be kept in a proper limit. In particular, when the imaging optical system is constructed as a variable magnification optical system, aberration produced in the deformable mirror can be kept within a proper limit in the whole range from the wide-angle position to the telephoto position. Also, the decentration in this case is the shift.

The imaging optical system is provided with a stop, which is preferably fixed in the magnification change. The stop is often placed in the proximity of a shutter. In such an arrangement, the stop is not moved in the magnification change and thus the shutter can also be fixed in the magnification change. Consequently, there is the merit that a mechanical structure can be simplified.

In the imaging optical system, it is favorable to satisfy the following condition:

$$|fG3/fw|<15.0 \quad (10\text{-}1)$$

where fG3 is the focal length of the lens unit G3.

By satisfying Condition (10-1), the Petzval sum of the imaging optical system can be reduced. As a result, curvature of field can be kept in a proper limit.

Instead of satisfying Condition (10-1), it is further favorable to satisfy the following condition:

$$|fG3/fw|<10.0 \quad (10\text{-}2)$$

When the optical system satisfies this condition, curvature of field can be further reduced.

The imaging optical system of the present invention includes, in order from the object side, the lens unit G1 with negative refracting power, the lens unit G2 with positive refracting power, the lens unit G3 with negative refracting power, the lens unit G4 with positive refracting power, and the lens unit G5. Each of the lens unit G2 and the lens unit G4 is moved independently along the optical axis. The imaging optical system satisfies one of the following conditions:

$$0.1<fG2/fw \quad (11\text{-}1)$$

$$0.1<fG4/fw \quad (11\text{-}2)$$

where fG2 is the focal length of the lens unit G2 and fG4 is the focal length of the lens unit G4.

By satisfying Condition (11-1) or (11-2), the power of each lens unit moved in the magnification change can be kept in a proper limit. Consequently, even when the lens unit G1 has the decentration error, deterioration in performance can be suppressed.

Instead of satisfying Conditions (11-1) and (11-2), it is further favorable to satisfy the following conditions:

$$0.25<fG2/fw \quad (11\text{-}3)$$

$$0.25<fG4/fw \quad (11\text{-}4)$$

When the optical system satisfies one of these conditions, less sensitivity to the decentration error is obtained. In Conditions (11-1), (11-2), (11-3), and (11-4), the value of the upper limit should be preferably smaller than 100.

In the imaging optical system, it is desirable that the lens unit G1 has at least one reflecting optical element. By doing so, the optical path of the imaging optical system can be bent. Since the position of path bending is located on the object side, the slim design of the imaging optical system is feasible.

In the imaging optical system, it is desirable to provide lens units arranged adjacent to the object side and the image side of the reflecting optical element. In addition, it is desirable to satisfy one of the following conditions:

$$0.1<D1/fw<10.0 \quad (12\text{-}1)$$

$$0.1<D2/fw<10.0 \quad (12\text{-}2)$$

where D1 is a distance between a lens unit placed adjacent to the object side and the reflecting optical element and D2 is a distance between a lens unit placed adjacent to the image side and the reflecting optical element.

Beyond the upper limit of Condition (12-1) or (12-2), compactness of the imaging optical system becomes difficult. Below the lower limit of Condition (12-1) or (12-2), spacing between the reflecting optical element and each of lenses located before and behind the reflecting optical element is narrowed. As a result, the reflecting optical element and each lens interfere mechanically, and therefore the placement of the optical element becomes difficult.

In the imaging optical system provided with the lens unit G5, it is favorable to satisfy the following condition:

$$0.2<|fG5/fw| \quad (13\text{-}1)$$

where fG5 is the focal length of the lens unit G5.

By satisfying Condition (13-1), deterioration in performance can be suppressed even when the lens unit G1 has the decentration error. In Condition (13-1), the value of the upper limit should be preferably smaller than 20.

In the above description, an optical system in which an image of an object is formed on a recording medium (an image sensor or a film) is assumed as the imaging optical system. However, the present invention is not limited to such an optical system. The imaging optical system can be used, for example, as a projection optical system, such as a projector, by replacing an object plane with an image plane.

In the deformable mirror itself, a change of the focal length due to the deformation of the reflecting surface is slight. Thus, even when the deformable mirror is replaced with an ordinary reflecting optical element, the above discussion is applicable.

Also, a free-formed surface used in the present invention is defined by the following equation. The Z axis of this equation corresponds to the axis of the free-formed surface.

$$Z = cr^2 / \left[1 + \sqrt{1 - (1+k)c^2 r^2}\right] + \sum_{j}^{N} C_j X^m Y^n \quad (a)$$

Here, the first term of this equation is a spherical surface term, and the second term is a free-formed surface term. In the spherical surface term, c is the curvature of the vertex, k is a conic constant, $r = \sqrt{(X^2 + Y^2)}$, N is a natural number of 2 or larger, m is an integral number of 0 or larger, and n is an integral number of 0 or larger.

The free-formed surface term is as follows:

$$\sum_{j}^{N} C_j X^m Y^n = C_2 X + C_3 Y +$$
$$C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 +$$
$$C_{33} X^3 Y^4 + C_{34} X^2 Y^5 + C_{35} XY^6 + C_{36} Y^7 \ldots$$

where $C_j$ (j is an integral number of 2 or larger) is a coefficient.

In general, the above-mentioned free-formed surface does not have a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

The free-formed surface of rotationally asymmetrical curved shape, mentioned above, can also be defined by the Zernike polynomial as another defining equation. The configuration of this surface is defined by the following equation. The Z axis of this equation corresponds to the axis of the Zernike polynomial. The rotationally asymmetrical surface is defined by polar coordinates of a height from the Z $$X = R \times \cos(A) \quad \text{(b)}$$
$$Y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) \ldots$$

where $D_m$ (m is an integral number of 2 or larger) is a coefficient. Also, in order to make a design as an optical system symmetrical with respect to the X axis, $D_4$, $D_5$, $D_6$, $D_{10}$, $D_{11}$, $D_{12}$, $D_{13}$, $D_{14}$, $D_{20}$, $D_{21}$, $D_{22}$, ... are used.

The above defining equation is shown to give an example of the configuration of the rotational asymmetrical curved surface, and it is needless to say that the same effect is secured with respect to any other defining equation. If mathematically identical values are given, the configuration of the curved surface may be expressed by another definition.

In the present invention, all odd-number order terms of X in Equation (a) are brought to zero and thereby the free-formed surface that has a symmetrical surface parallel to the Y-Z plane is obtained.

Also, when Z is taken as the coordinate in the direction of the optical axis, Y is taken as the coordinate normal to the optical axis, k represents a conic constant, and a, b, c, and d represent aspherical coefficients, the configuration of an aspherical surface is expressed by the following equation:

$$Z=(Y^2/r)/[1+\{1-(1+k)\cdot(Y/r)^2\}^{1/2}]+ay^4+by^6+cy^8+dy^{10} \quad \text{(c)}$$

These symbols are also used for the numerical data of the embodiments to be described later.

The embodiments of the imaging optical system of the present invention will be described below.

First Embodiment

Figure 1B:
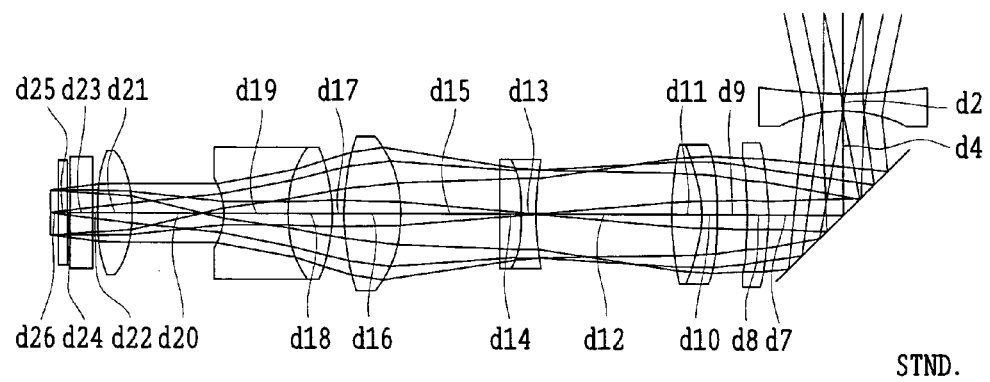
Figure 1C:
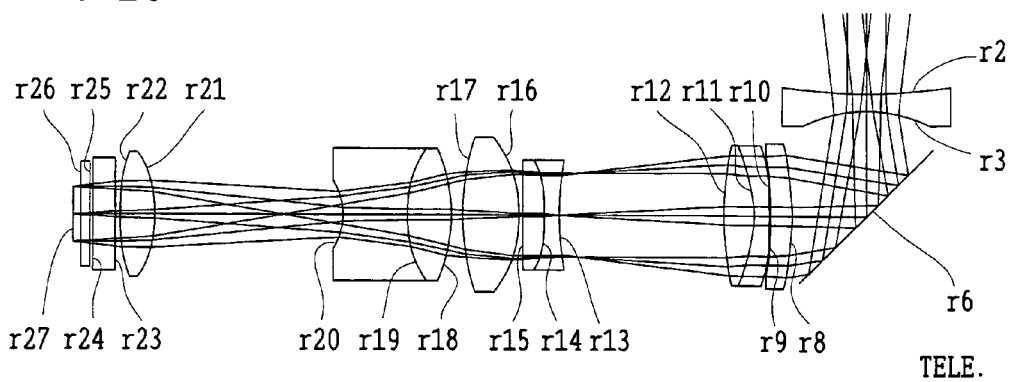
Figure 2:
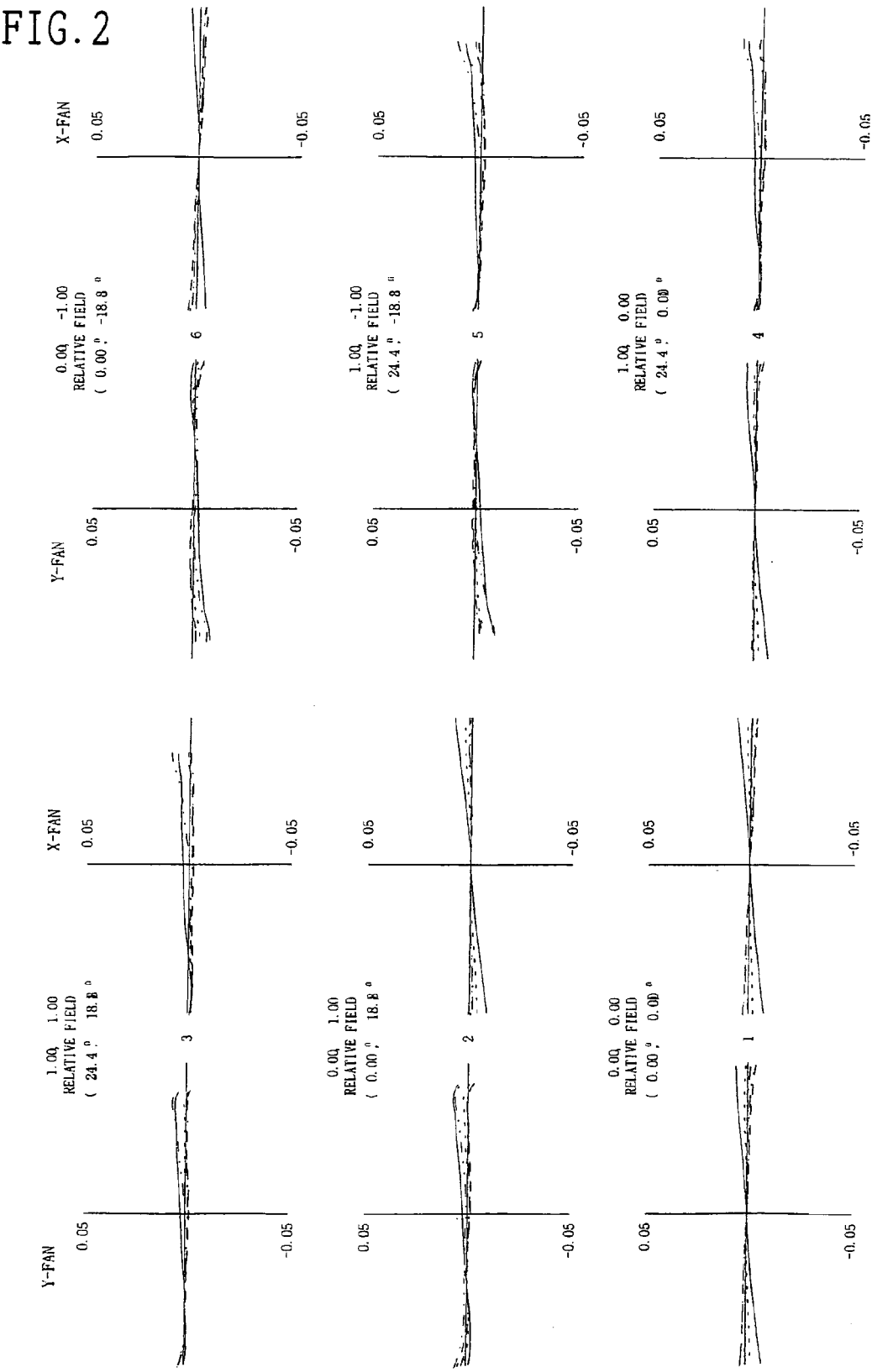
FIG. 2 is diagrams showing transverse aberration characteristics at the wide-angle position where the object point distance is infinite in the first embodiment.
Figure 3:
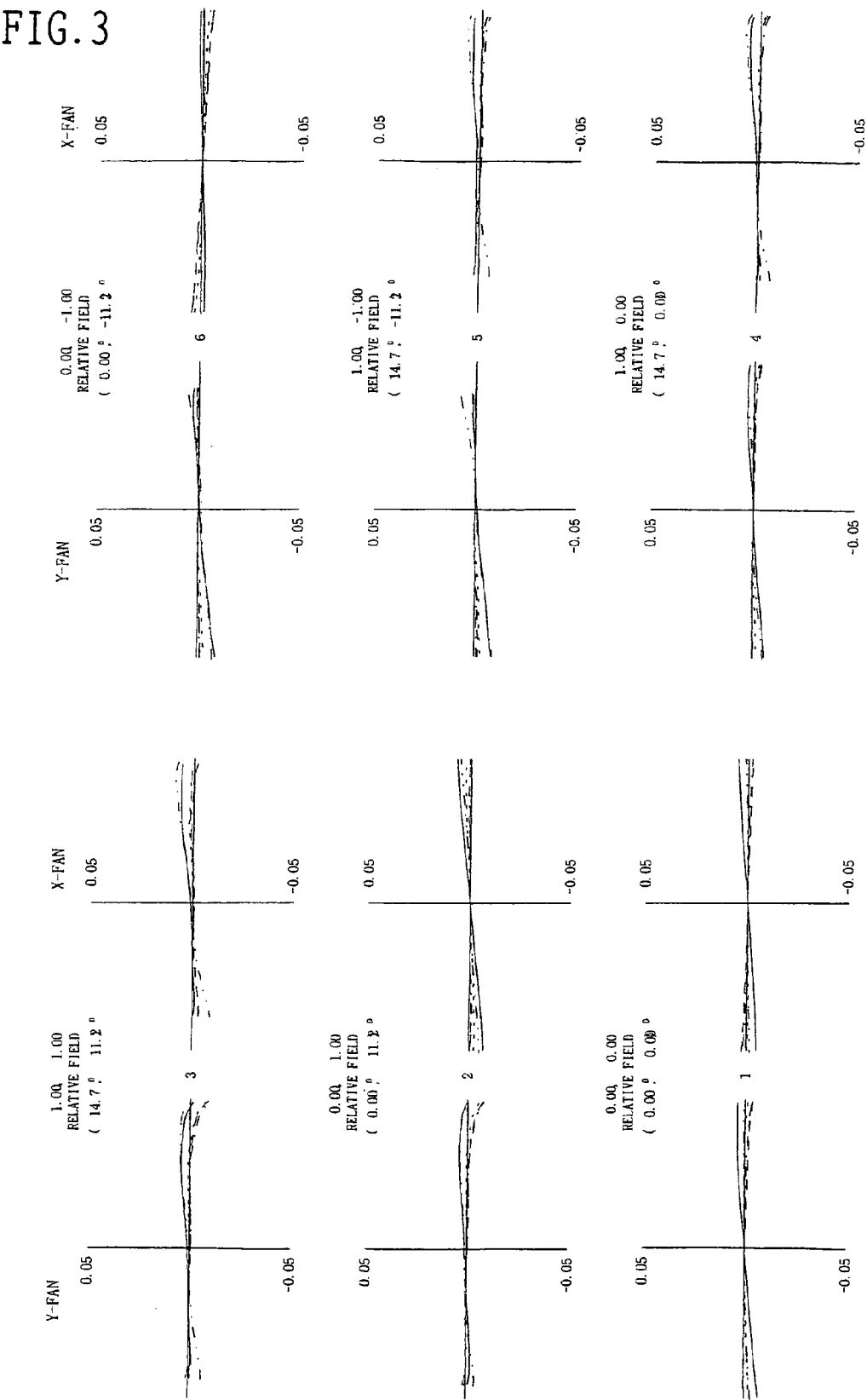
FIG. 3 is diagrams showing transverse aberration characteristics at the standard position where the object point distance is infinite in the first embodiment.
Figure 4:
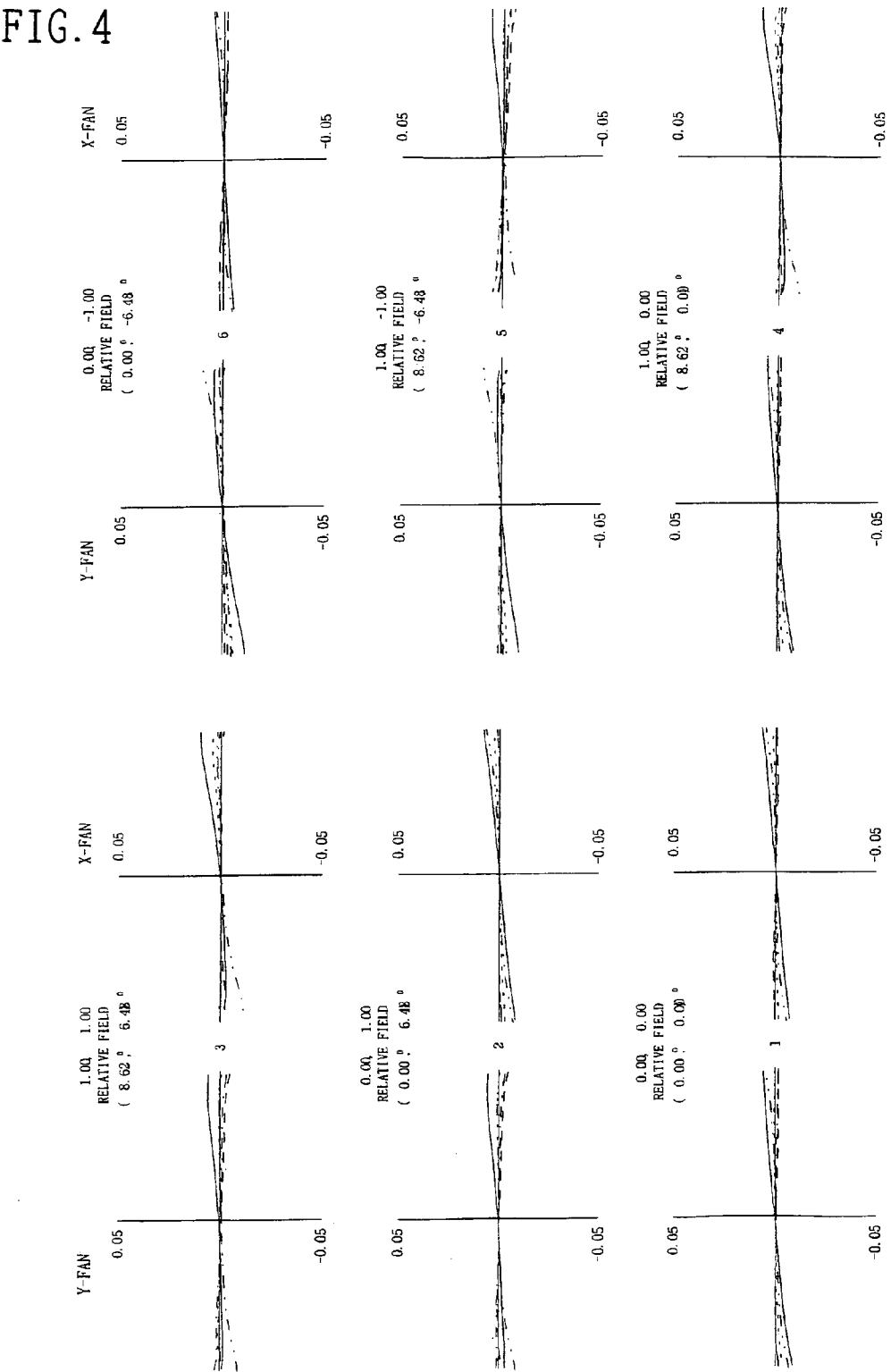
FIG. 4 is diagrams showing transverse aberration characteristics at the telephoto position where the object point distance is infinite in the first embodiment.

The imaging optical system of the first embodiment is shown in FIGS. 1A–1C. The diagrams of transverse aberration characteristics of the first embodiment are shown in FIGS. 2–4. In these diagrams, solid lines indicate aberration curves at a wavelength of 656.27 nm; dotted lines, 587.56 nm; one-dash lines, 546.07 nm; broken lines, 486.13 nm; and two-dash lines, 435.83 nm.

The imaging optical system of the first embodiment is constructed with the first to fifth lens units G1–G5 arranged in this order from the object side.

The first lens unit G1 has negative refracting power and includes, in order from the object side, a biconcave lens, the deformable mirror, and a positive meniscus lens with a convex surface facing the object side. The second lens unit G2 has positive refracting power and includes a cemented doublet of a negative lens and a positive lens. This cemented doublet is made up of a negative meniscus lens with a convex surface facing the object side and a biconvex lens. The third lens unit G3 has negative refracting power and includes a cemented doublet of a negative lens and a positive lens. This cemented doublet is made up of a biconcave lens and a positive meniscus lens with a convex surface facing the object side. The fourth lens unit G4 has positive refracting power and includes a biconvex lens and a cemented doublet of a positive lens and a negative lens. This cemented doublet is made up of a biconvex lens and a biconcave lens. The fifth lens unit G5 has positive refracting power and includes a biconvex lens.

Aspherical surfaces (ASP) are used for the image-side surface of the biconcave lens in the first lens unit G1, the image-side surface of the cemented doublet in the second lens unit G2, and both surfaces of the single convex lens in the fourth lens unit G4. The free-formed surface (FFS) corresponds to the mirror surface of the deformable mirror.

In the first lens unit G1, the biconcave lens is shifted in the direction of the Y axis (+) and additionally is tilted. The positive meniscus lens is shifted in the direction of the Y axis (−). In the second lens unit G2, the entire cemented doublet is shifted in the direction of the Y axis (+). In the third lens unit G3, the entire cemented doublet is shifted in the direction of the Y axis (−). In the fourth lens unit G4, the biconvex lens is shifted in the direction of the Y axis (+). On the other hand, the cemented doublet is shifted in the direction of the Y axis (−). In the fifth lens unit G5, the biconvex lens is shifted in the direction of the Y axis (−). The image sensor located at the position of the image plane is tilted.

Each of the second lens unit G2 and the fourth lens unit G4 is moved independently along the optical axis. Whereby, the magnification change of the imaging optical system can be carried out. Also, in the first embodiment, the variable magnification ratio is 3.

Focusing is performed by the deformable mirror. Whereby, the structure of the lens frame is simplified, and a compact design and a cost reduction can be achieved. Moreover, there is the merit that the driving noise of a motor in focusing is eliminated.

Second Embodiment

Figure 5A:
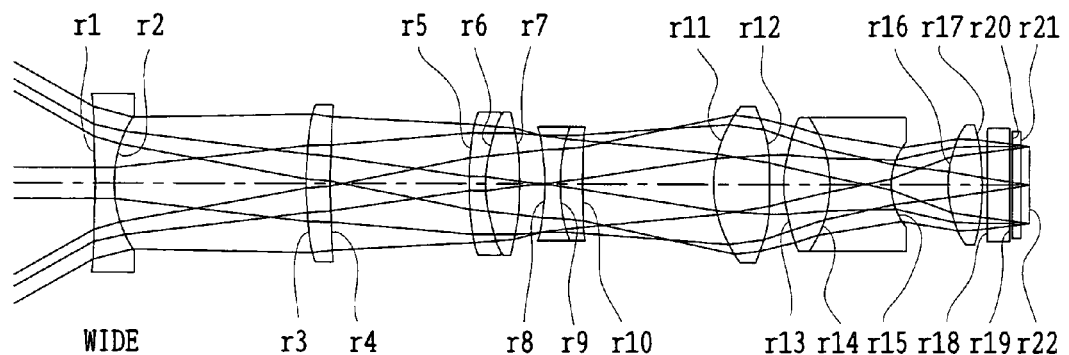
FIGS. 5A, 5B, and 5C are Y-Z sectional views showing optical arrangements at wide-angle, standard, and telephoto positions, respectively, of the optical system of a second embodiment in the present invention.
Figure 5B:
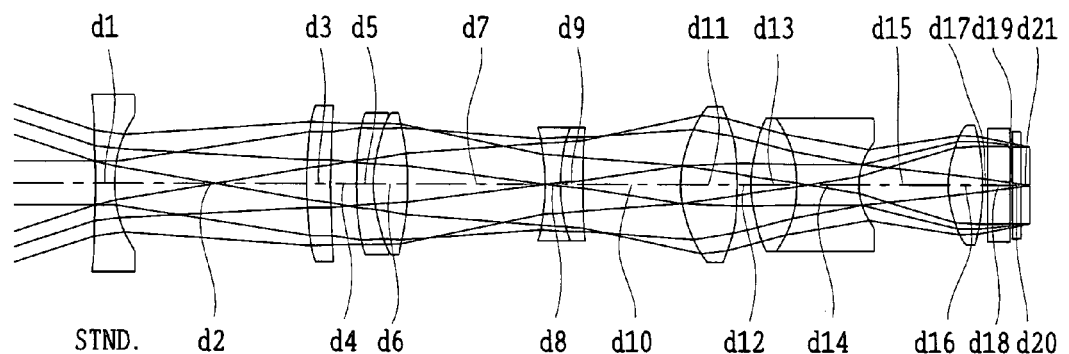
Figure 5C:
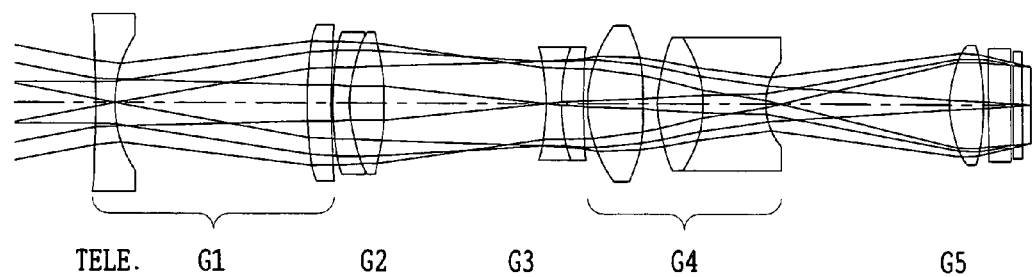
Figure 5C:
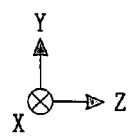
Figure 6:
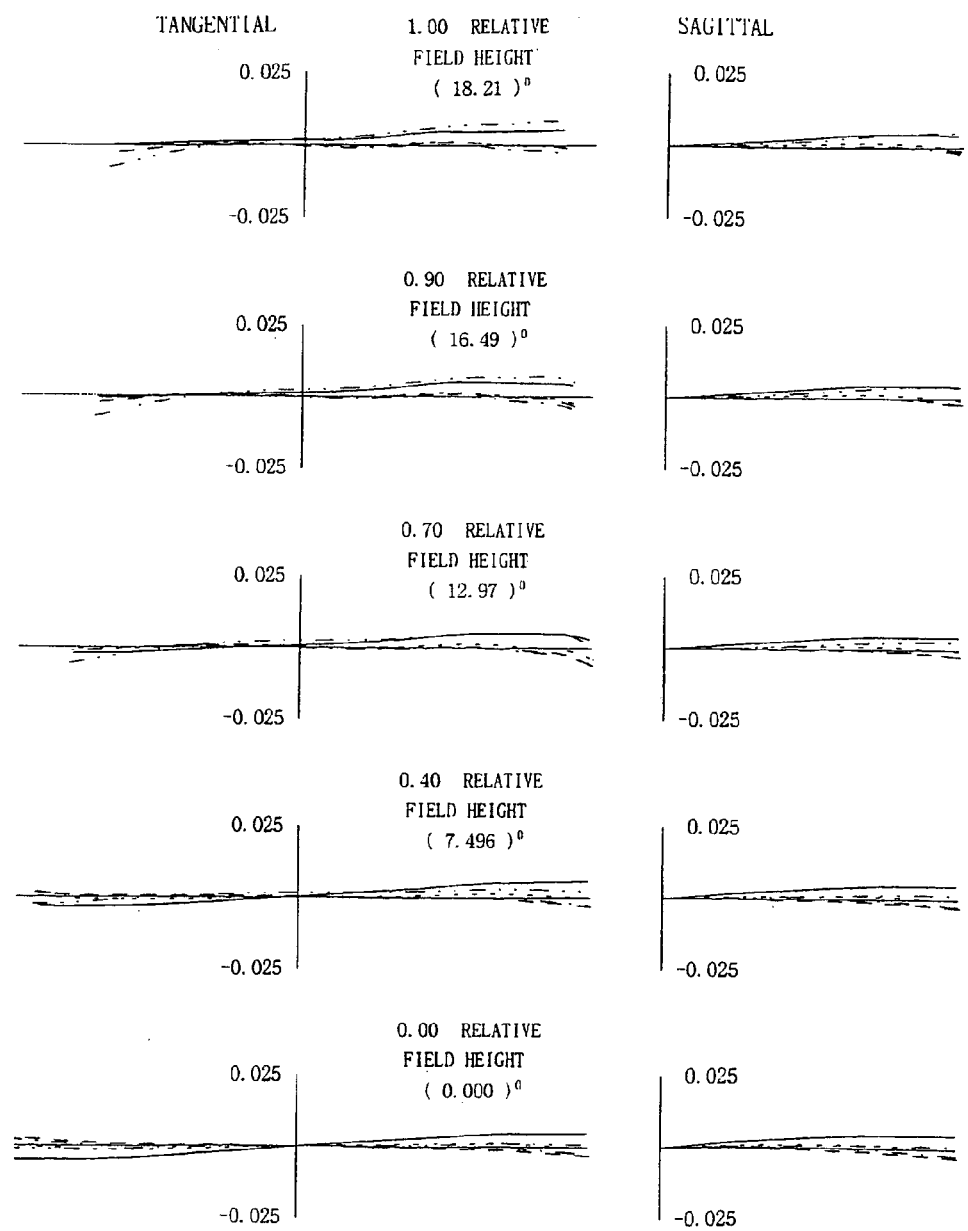
FIG. 6 is diagrams showing transverse aberration characteristics at the wide-angle position where the object point distance is infinite in the second embodiment.
Figure 7:
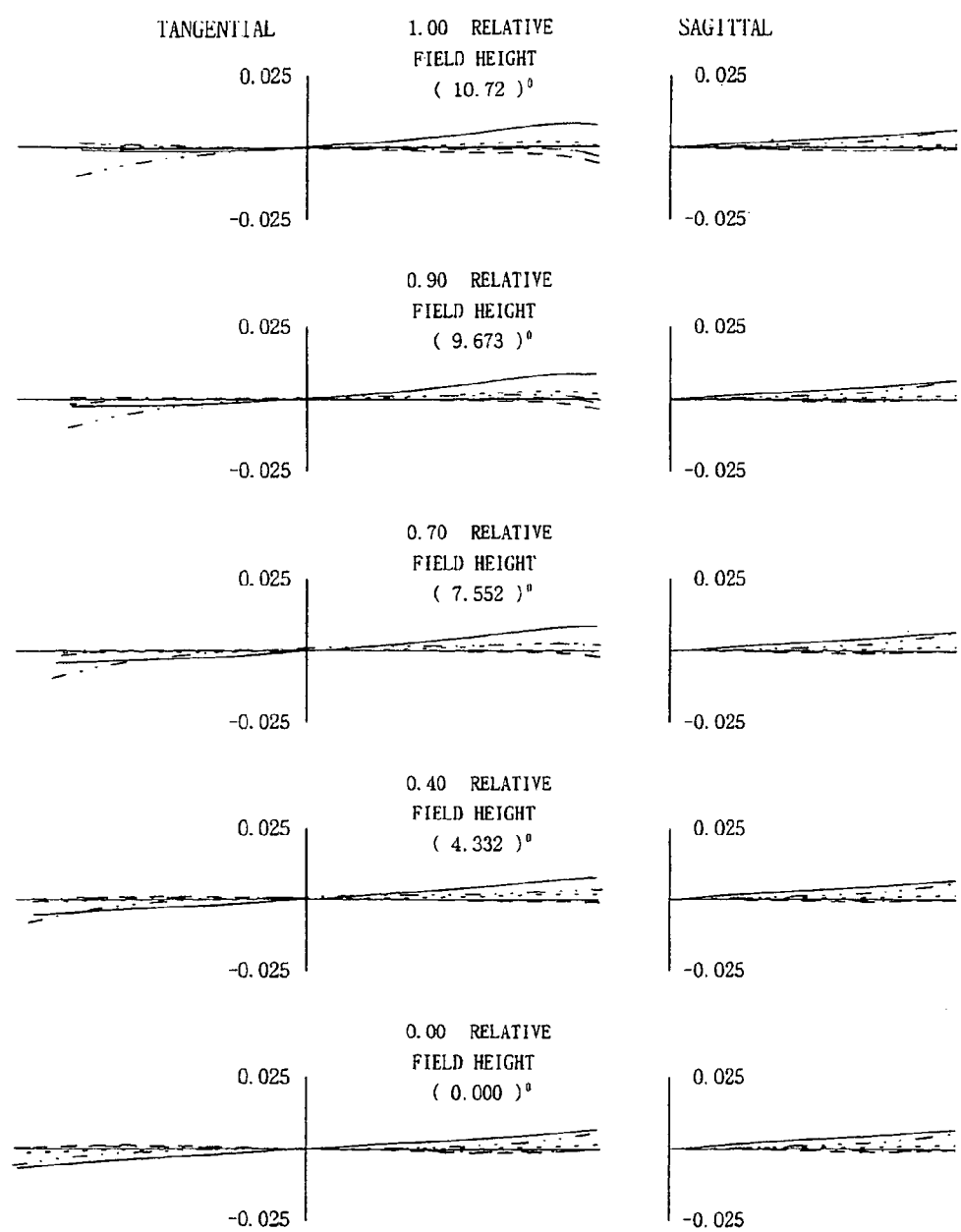
FIG. 7 is diagrams showing transverse aberration characteristics at the standard position where the object point distance is infinite in the second embodiment.
Figure 8:
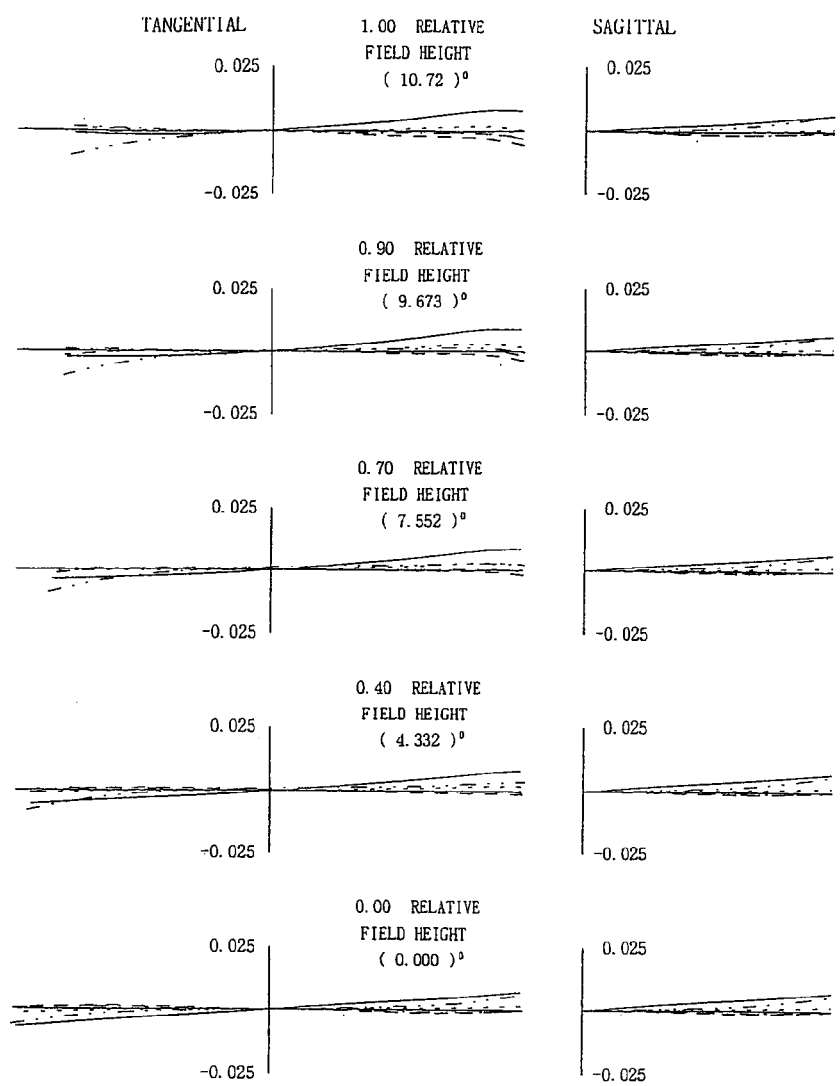
FIG. 8 is diagrams showing transverse aberration characteristics at the telephoto position where the object point distance is infinite in the second embodiment.

The imaging optical system of the second embodiment is shown in FIGS. 5A–5C. The diagrams of transverse aberration characteristics of the second embodiment are shown in FIGS. 6–8.

The second embodiment is relative to a coaxial imaging optical system in which the deformable mirror is not included. The imaging optical system of the second embodiment is constructed with the first to fifth lens units G1–G5 arranged in this order from the object side.

The first lens unit G1 has negative refracting power and includes a biconcave lens and a positive lens. The second lens unit G2 has positive refracting power and includes a cemented doublet. This cemented doublet is made up of a negative meniscus lens with a convex surface facing the object side and a biconvex lens. The third lens unit G3 has negative refracting power and includes a cemented doublet. This cemented doublet is made up of a biconcave lens and a positive meniscus lens with a convex surface facing the object side. The fourth lens unit G4 has positive refracting power and includes a biconvex lens and a cemented doublet. This cemented doublet is made up of a biconvex lens and a biconcave lens. The fifth lens unit G5 has positive refracting power and includes a biconvex lens.

Aspherical surfaces (ASP) are used for the image-side surface of the biconcave lens in the first lens unit G1, the image-side surface of the cemented doublet in the second lens unit G2, and both surfaces of the single convex lens in the fourth lens unit G4.

Each of the second lens unit G2 and the fourth lens unit G4 is moved independently along the optical axis. Whereby, the magnification change of the imaging optical system can be carried out. Also, in the second embodiment, the variable magnification ratio is 3. Since the stop is fixed in the magnification change, the shutter can also be fixed in the magnification change. Consequently, the structure of the lens frame is simplified and a cost reduction can be achieved.

In the numerical data of the embodiments to be described below, S denotes the stop, ASP denotes the aspherical surface, FFS denotes the free-formed surface, and DM denotes the deformable mirror. The terms relating to the aspherical surface and the free-formed surface which are not described in the data are zero. E-06 or e refers to 10-06. WE, ST, and TE denote the wide-angle position, the standard position, and the telephoto position, respectively. A variable spacing Di (i=1, 2, 3) denotes the value of spacing at the wide-angle, standard, and telephoto positions, respectively. The refractive index and the Abbe's number are relative to the d line (wavelength 587.56 nm). The length and angle are expressed by mm and deg, respectively. In each embodiment, two plane-parallel plates are located at the most image-side position. These are assumed as the cover glass of the image sensor and an IR cutoff filter or a low-pass filter.

In the embodiments, the Z axis of the coordinate system on the object plane is defined as a straight line that passes through the center of the object and is perpendicular to the object plane. The Y axis is taken in a direction perpendicular to the Z axis, and an axis constituting the right-handed coordinate system with the Y axis and the Z axis is taken as the X axis. The coordinate system of the optical system after a ray of light is reflected by the reflecting surface is defined as a coordinate system where the coordinate system before reflection is rotated by 180° around the X axis. Whereby, the ray always travels along a positive direction of the Z axis of the optical system.

The optical axis is defines as the path of the ray that passes through the center of the object plane and the center of the stop or the center of the object plane and the exit pupil. Thus, the optical axis is generally changed in accordance with the deformation of the deformable mirror, but its change is slight in most cases. In the embodiments, therefore, the Z axis practically coincides with the optical axis.

A decentering surface is given by the shift of the vertex position of this surface (the directions of X, Y, and Z axes are denoted by X, Y, and Z, respectively) from the origin of the coordinate system and by the tilt ($\alpha$, $\beta$, and $\gamma$ (deg)) of the center axis of the surface (the Z axis of Equation (a) in the free-formed surface), with the X, Y, and Z axes as centers. When a surface to be decentered is called a k surface, the origin of the coordinate system where decentration takes place is defined as a point shifted from the vertex position of a k−1 surface along the Z axis for surface-to-surface spacing.

The decentration takes place in order of X shift, Y shift, Z shift, $\alpha$ tilt, $\beta$ tilt, and $\gamma$ tilt. In this case, the plus sign of each of $\alpha$ and $\beta$ indicates a counterclockwise direction where each of the X axis and the Y axis is viewed from a minus side, and the plus sign of $\gamma$ indicates a clockwise direction where the Z axis is viewed from a minus direction.

Also, there are two kinds of decentration, decenter-and-return (DAR) and decenter-only (DEO). In the DAR, when the k surface has been decentered, each of the coordinate systems of a k+1 surface and surfaces lying behind it coincides with that of the k surface before decentration. The vertex position of the k+1 surface is defined as a point shifted from that of the k surface before decentration along the Z axis for surface-to-surface spacing. In the DEO, on the other hand, when the k surface has been decentered, each of the coordinate systems of the k+1 surface and surfaces lying behind it coincides with that of the k surface after decentration. The vertex position of the k+1 surface is defined as a point shifted from that of the k surface after decentration along the Z axis for surface-to-surface spacing.

The positive direction of the Z axis of the coordinate system of a reflecting surface refers to a direction in which the axis travels from the obverse of the reflecting surface toward the reverse. Thus, when the reflecting surface is changed into the free-formed surface shape expressed by the X-Y polynomial and the power components $C_4$ and $C_6$ are positive, the reflecting surface becomes a convex mirror, that is, a mirror with negative power. Conversely, when the power components $C_4$ and $C_6$ are negative, a concave mirror, that is, a mirror with positive power, is obtained.

The deformable mirror performs auto-focusing of a contrast method. Thus, it is designed to bring about a state of weaker power than in focusing at the far point and a state of stronger power than in focusing at the near point.

Also, the state of weaker power than in focusing at the far point is defined as far-point allowance, and a state of stronger power than in focusing at the near point is defined as near-point allowance. That is, the deformable mirror has four states, the far-point allowance, the far point, the near point, and the near-point allowance. Additionally, in each of these states, there are three zoom conditions, the wide-angle, standard, and telephoto positions in the magnification change. Thus, the deformable mirror has 12 deformation states in total.

The deformable mirror is designed to consider the shift of the image plane in the Z direction caused by a fabrication error in actual fabrication and by a temperature change. Thus, in addition to a deformation limit for focusing, the deformable mirror is designed to have the allowance of the amount of deformation before and after the deformation limit.

Numerical data of the first embodiment
Focal length: 4.4 mm–13.2 mm
Open F-number: 2.4–5.3
Size of imaging surface: 4.0 mm × 3.0 mm

| Surface number | Radius of curvature | Surface spacing | Decentration | Refractive index | Abbe's number |
|---|---|---|---|---|---|
| 1 | ∞ (virtual plane) | 0.00 | | | |
| 2 | −50.749 | 1.00 | Decentration (1) | 1.7800 | 50.0 |
| 3 | ASP [1] (return to the first surface) | | | | |
| 4 | ∞ (virtual plane) | 7.60 | | | |
| 5 | ∞ | 0.00 | Decentration (2) | | |
| 6 | FFS [1] (DM) | 0.00 | Decentration (3) | | |
| 7 | ∞ | 4.64 | Decentration (2) | | |
| 8 | 19.941 | 1.27 | Decentration (4) | 1.8500 | 24.0 |
| 9 | 29.657 | D1 | Decentration (4) | | |
| 10 | 21.472 | 1.00 | Decentration (5) | 1.8500 | 24.0 |
| 11 | 10.211 | 1.86 | Decentration (5) | 1.6173 | 57.3 |
| 12 | ASP [2] | D2 | Decentration (5) | | |
| 13 | −14.920(S) | 1.00 | Decentration (6) | 1.7281 | 48.3 |
| 14 | 11.255 | 1.33 | Decentration (6) | 1.8500 | 24.0 |
| 15 | 77.407 | D3 | Decentration (6) | | |
| 16 | ASP [3] | 3.56 | Decentration (7) | 1.4900 | 70.0 |
| 17 | ASP [4] | 0.75 | Decentration (7) | | |
| 18 | 9.803 | 2.77 | Decentration (8) | 1.5269 | 65.1 |
| 19 | −7.449 | 3.89 | Decentration (8) | 1.7727 | 31.5 |
| 20 | 4.259 | D4 | Decentration (8) | | |
| 21 | 7.432 | 2.13 | Decentration (9) | 1.4900 | 70.0 |
| 22 | −14.274 | 0.30 | Decentration (9) | | |
| 23 | ∞ | 1.44 | | 1.5477 | 62.8 |
| 24 | ∞ | 0.10 | | | |
| 25 | ∞ | 0.60 | | 1.5163 | 64.1 |
| 26 | ∞ | 0.50 | | | |
| 27 | ∞ (image plane) | | Decentration (10) | | |

WE~ST~TE

D1 = 8.54~1.80~0.10
D2 = 1.70~8.44~10.14
D3 = 8.55~6.17~0.20
D4 = 3.27~5.65~11.62

ASP [1]

| | Radius of curvature | | −7.179 | k | 0.0000e+000 | |
|---|---|---|---|---|---|---|
| a | 3.8858e−004 | b | 3.6372e−006 | c | 8.8491e−008 | d | −3.2705e−010 |

ASP [2]

| | Radius of curvature | | −16.032 | k | 0.0000e+000 | |
|---|---|---|---|---|---|---|
| a | 4.4224e−005 | b | 5.4185e−009 | c | 1.6428e−008 | d | −7.0199e−010 |

ASP [3]

| | Radius of curvature | | 7.704 | k | 0.0000e+000 | |
|---|---|---|---|---|---|---|
| a | −1.6991e−004 | b | −1.7112e−007 | c | 3.8286e−008 | d | −7.0832e−009 |

ASP [4]

| | Radius of curvature | | −12.011 | k | 0.0000e+000 | |
|---|---|---|---|---|---|---|
| a | 2.8459e−004 | b | 1.9921e−006 | c | −1.3381e−007 | d | −3.1611e−009 |

-continued

Numerical data of the first embodiment
Focal length: 4.4 mm–13.2 mm
Open F-number: 2.4–5.3
Size of imaging surface: 4.0 mm × 3.0 mm Decentration [1] (DEO)

| X | 0.000 | Y | 0.064 | Z | 0.000 | α | −0.759 | β | 0.000 | γ | 0.000 |

Decentration [2] (DEO)

| X | 0.000 | Y | 0.000 | Z | 0.000 | α | 45.000 | β | 0.000 | γ | 0.000 |

Decentration [3] (DAR)

| X | 0.000 | Y (described in FFS [1]) | Z (described in FFS [1]) | α | −0.285 | β | 0.000 | γ | 0.000 |

Decentration [4] (DAR)

| X | 0.000 | Y | −0.003 | Z | 0.000 | α | 0.000 | β | 0.000 | γ | 0.000 |

Decentration [5] (DAR)

| X | 0.000 | Y | 0.047 | Z | 0.000 | α | 0.000 | β | 0.000 | γ | 0.000 |

Decentration [6] (DAR)

| X | 0.000 | Y | −0.071 | Z | 0.000 | α | 0.000 | β | 0.000 | γ | 0.000 |

Decentration [7] (DAR)

| X | 0.000 | Y | 0.014 | Z | 0.000 | α | 0.000 | β | 0.000 | γ | 0.000 |

Decentration [8] (DAR)

| X | 0.000 | Y | −0.002 | Z | 0.000 | α | 0.000 | β | 0.000 | γ | 0.000 |

Decentration [9] (DAR)

| X | 0.000 | Y | −0.189 | Z | 0.000 | α | 0.000 | β | 0.000 | γ | 0.000 |

Decentration [10] (DAR)

| X | 0.000 | Y | 0.000 | Z | 0.000 | α | −1.146 | β | 0.000 | γ | 0.000 |

FFS [1]

|   | WE far-point allowance | ST far-point allowance | TE far-point allowance |
| --- | --- | --- | --- |
| C4  | 0.00000 | 0.00000 | 0.00000 |
| C6  | 0.00000 | 0.00000 | 0.00000 |
| C8  | 0.00000 | 0.00000 | 0.00000 |
| C10 | 0.00000 | 0.00000 | 0.00000 |
| C11 | 0.00000 | 0.00000 | 0.00000 |
| C13 | 0.00000 | 0.00000 | 0.00000 |
| C15 | 0.00000 | 0.00000 | 0.00000 |
| C17 | 0.00000 | 0.00000 | 0.00000 |
| C19 | 0.00000 | 0.00000 | 0.00000 |
| C21 | 0.00000 | 0.00000 | 0.00000 |
| Y   | 0.00000 | 0.00000 | 0.00000 |
| Z   | 0.00000 | 0.00000 | 0.00000 |

|   | WE ∞ | ST ∞ | TE ∞ |
| --- | --- | --- | --- |
| C4  | −0.5900E−03 | −0.2265E−03 | −0.1063E−03 |
| C6  | −0.2942E−03 | −0.1118E−03 | −0.5118E−04 |
| C8  | −0.1190E−04 | −0.7626E−05 | −0.3054E−05 |
| C10 | −0.5236E−05 | −0.2958E−05 | −0.1320E−05 |
| C11 | 0.6539E−05 | 0.2526E−05 | 0.1742E−05 |
| C13 | 0.5614E−05 | 0.1972E−05 | 0.1505E−05 |
| C15 | 0.1585E−05 | 0.6526E−06 | 0.3945E−06 |
| C17 | 0.5436E−06 | 0.2566E−06 | 0.1161E−06 |
| C19 | −0.1984E−07 | −0.7409E−07 | −0.7818E−07 |
| C21 | 0.1441E−06 | 0.5020E−07 | 0.2135E−07 |
| Y   | 0.02568 | 0.06727 | −0.28997 |
| Z   | 0.00757 | 0.00280 | 0.00119 |

|   | WE 300 mm | ST 300 mm | TE 300 mm |
| --- | --- | --- | --- |
| C4  | −0.8999E−03 | −0.5520E−03 | −0.4454E−03 |
| C6  | −0.4603E−03 | −0.2822E−03 | −0.2330E−03 |
| C8  | −0.1271E−04 | −0.1511E−04 | −0.1532E−04 |
| C10 | −0.9223E−05 | −0.8088E−05 | −0.9339E−05 |
| C11 | 0.5833E−05 | 0.1082E−05 | 0.6791E−06 |
| C13 | 0.5224E−05 | 0.8552E−06 | 0.3799E−06 |
| C15 | 0.1353E−05 | −0.2418E−06 | 0.5888E−07 |

-continued

Numerical data of the first embodiment
Focal length: 4.4 mm–13.2 mm
Open F-number: 2.4–5.3
Size of imaging surface: 4.0 mm × 3.0 mm

| | | | |
|---|---|---|---|
| C17 | −0.1388E−06 | −0.2624E−06 | −0.1260E−06 |
| C19 | 0.2954E−06 | −0.1218E−07 | 0.9767E−07 |
| C21 | 0.1264E−06 | −0.6137E−07 | 0.4632E−07 |
| Y | 0.18132 | 0.46081 | 0.45036 |
| Z | 0.01270 | 0.00836 | 0.00675 |

| | WE near-point allowance | ST near-point allowance | TE near-pont allowance |
|---|---|---|---|
| C4 | −0.1430E−02 | −0.7664E−03 | −0.5480E−03 |
| C6 | −0.7424E−03 | −0.3990E−03 | −0.2865E−03 |
| C8 | −0.3091E−04 | −0.2675E−04 | −0.2151E−04 |
| C10 | −0.2561E−04 | −0.1455E−04 | −0.1164E−04 |
| C11 | 0.7565E−05 | 0.2368E−05 | 0.1185E−05 |
| C13 | 0.5863E−05 | 0.2277E−05 | 0.1879E−06 |
| C15 | 0.2005E−05 | 0.2200E−06 | 0.1419E−06 |
| C17 | −0.2360E−06 | 0.1344E−06 | 0.1046E−06 |
| C19 | 0.1098E−05 | 0.4176E−06 | 0.1021E−06 |
| C21 | 0.4660E−06 | 0.5764E−07 | 0.7236E−07 |
| Y | 0.26318 | 0.46261 | 0.45429 |
| Z | 0.02075 | 0.01146 | 0.00826 |

TABLE 1

| | | |
|---|---|---|
| fw | Focal length (mm) of the imaging optical system at the wide-angle position | 4.402 |
| ft | Focal length (mm) of the imaging optical system at the telephoto position | 13.195 |
| fG1 | Focal length (mm) of the first lens unit | −10.906 |
| fG1p | Focal length (mm) of the lens unit located on the image side of the deformable mirror of the first lens unit | 67.561 |
| fG2 | Focal length (mm) of the second lens unit | 18.452 |
| fG3 | Focal length (mm) of the third lens unit | −20.303 |
| fG4 | Focal length (mm) of the fourth lens unit | 12.976 |
| fG5 | Focal length (mm) of the fifth lens unit | 10.306 |
| \|δ\| | Maximum value (mm) of shift decentration of the lens | 0.189 |
| \|ε\| | Maximum value (deg) of tilt decentration of the lens or image sensor | 1.146 |
| d1 | Distance (mm) between the deformable mirror and the lens located on the object side of the deformable mirror | 7.599 |
| d2 | Distance (mm) between the deformable mirror and the lens located on the image of the deformable mirror | 4.640 |

TABLE 1-continued

| | | |
|---|---|---|
| \|θ\| | Angle (deg) of bending of the axial chief ray by the deformable mirror | 90.000 |

TABLE 2

| | |
|---|---|
| d1/fw | 1.726 |
| d2/fw | 1.054 |
| fG1/fw | −2.478 |
| fG1p/fw | 15.348 |
| fG2/fw | 4.192 |
| fG3/fw | −4.612 |
| fG4/fw | 2.948 |
| fG5/fw | 2.341 |
| δ/fw | 0.043 |
| \|ε\| (deg) | 1.146 |
| \|θ\| (deg) | 90.000 |

TABLE 3

| Object distance | Zoom condition | $C_4$ (coefficient of $x^2$) | $C_6$ (coefficient of $y^2$) |
|---|---|---|---|
| ∞ allowance | Wide-angle position | 0.000E+00 | 0.000E+00 |
| ∞ allowance | Standard position | 0.000E+00 | 0.000E+00 |
| ∞ allowance | Telephoto position | 0.000E+00 | 0.000E+00 |
| ∞ | Wide-angle position | −5.900E−04 | −2.942E−04 |
| ∞ | Standard position | −2.265E−04 | −1.118E−04 |
| ∞ | Telephoto position | −1.063E−04 | −5.118E−05 |
| 300 mm | Wide-angle position | −8.999E−04 | −4.603E−04 |
| 300 mm | Standard position | −5.520E−04 | −2.822E−04 |
| 300 mm | Telephoto position | −4.454E−04 | −2.330E−04 |
| 300 mm allowance | Wide-angle position | −1.430E−03 | −7.424E−04 |
| 300 mm allowance | Standard position | −7.664E−04 | −3.990E−04 |
| 300 mm allowance | Telephoto position | −5.480E−04 | −2.865E−04 |

Numerical data of the second embodiment
Focal length: 4.4 mm–13.2 mm
Open F-number: 2.4–5.3
Size of imaging surface: 4.0 mm × 3.0 mm

| Surface number | Radius of curvature | Surface spacing | Decentration | Refractive index | Abbe's number |
|---|---|---|---|---|---|
| 1 | −60.147 | 1.20 | | 1.7800 | 50.0 |
| 2 | ASP[1] | 11.80 | | | |
| 3 | 20.572 | 1.50 | | 1.8500 | 24.0 |
| 4 | 29.740 | D1 | | | |
| 5 | 20.562 | 1.00 | | 1.8500 | 24.0 |
| 6 | 10.065 | 2.10 | | 1.6173 | 57.3 |
| 7 | ASP[2] | D2 | | | |
| 8 | −14.713(s) | 1.00 | | 1.7281 | 49.0 |
| 9 | 11.104 | 1.35 | | 1.8500 | 24.0 |
| 10 | 67.284 | D3 | | | |
| 11 | ASP[3] | 3.52 | | 1.4900 | 70.0 |
| 12 | ASP[4] | 0.85 | | | |
| 13 | 9.942 | 2.82 | | 1.5269 | 65.1 |
| 14 | −7.400 | 3.83 | | 1.7727 | 31.2 |
| 15 | 4.218 | D4 | | | |
| 16 | 7.388 | 2.09 | | 1.4900 | 70.0 |
| 17 | −13.557 | 0.30 | | | |
| 18 | ∞ | 1.44 | | 1.5477 | 62.8 |
| 19 | ∞ | 0.10 | | | |
| 20 | ∞ | 0.60 | | 1.5163 | 64.1 |
| 21 | ∞ | 0.50 | | | |
| 22 | ∞ (image plane) | | | | |

WE~ST~TE

D1 = 8.71~1.77~0.10
D2 = 1.57~8.51~10.18
D3 = 8.14~6.04~0.20
D4 = 3.60~5.69~11.53

ASP[1]

| | Radius of curvature | | 7.023 | | k | 0.0000e+000 | |
|---|---|---|---|---|---|---|---|
| a | −3.8281e−004 | b | −3.9939e−006 | c | −7.2678e−008 | d | −6.9757e−010 |

ASP[2]

| | Radius of curvature | | −16.106 | | k | 0.0000e+000 | |
|---|---|---|---|---|---|---|---|
| a | 4.3370e−005 | b | 3.2495e−008 | c | 8.9602e−009 | d | −3.8588e−010 |

ASP[3]

| | Radius of curvature | | 7.615 | | k | 0.0000e+000 | |
|---|---|---|---|---|---|---|---|
| a | −1.8702e−004 | b | −7.1210e−007 | c | 9.0747e−008 | d | −9.0563e−009 |

ASP[4]

| | Radius of curvature | | −12.045 | | k | 0.0000e+000 | |
|---|---|---|---|---|---|---|---|
| a | 2.7967e−004 | b | 2.4104e−006 | c | −1.2665e−007 | d | −4.1114e−009 |

TABLE 4

| fw | Focal length (mm) of the imaging optical system at the wide-angle position | 4.339 |
|---|---|---|
| ft | Focal length (mm) of the imaging optical system at the telephoto position | 13.200 |
| fG1 | Focal length (mm) of the first lens unit | −10.652 |
| fG2 | Focal length (mm) of the second lens unit | 18.093 |
| fG3 | Focal length (mm) of the third lens unit | −19.401 |
| fG4 | Focal length (mm) of the fourth lens unit | 12.812 |
| fG5 | Focal length (mm) of the fifth lens unit | 10.090 |

TABLE 5

| fG1/fw | −2.421 |
|---|---|
| fG2/fw | 4.113 |
| fG3/fw | −4.410 |

TABLE 5-continued

| fG4/fw | 2.912 |
|---|---|
| fG5/fw | 2.294 |

The imaging optical system according to the present invention is applicable to a film camera, a digital camera, a video camera, a TV camera, a camera for personal digital assistants (PDAs), a camera for mobile phones, a vehicle mounted camera, a monitoring camera, a robot's eye, and an electrical endoscope.

Here, a description will be given of the structural examples of variable optical-property mirrors and variable optical-property focal-length lenses as variable optical-property elements applicable to the present invention.

EXAMPLE 1 OF DEFORMABLE MIRROR

Figure 9:
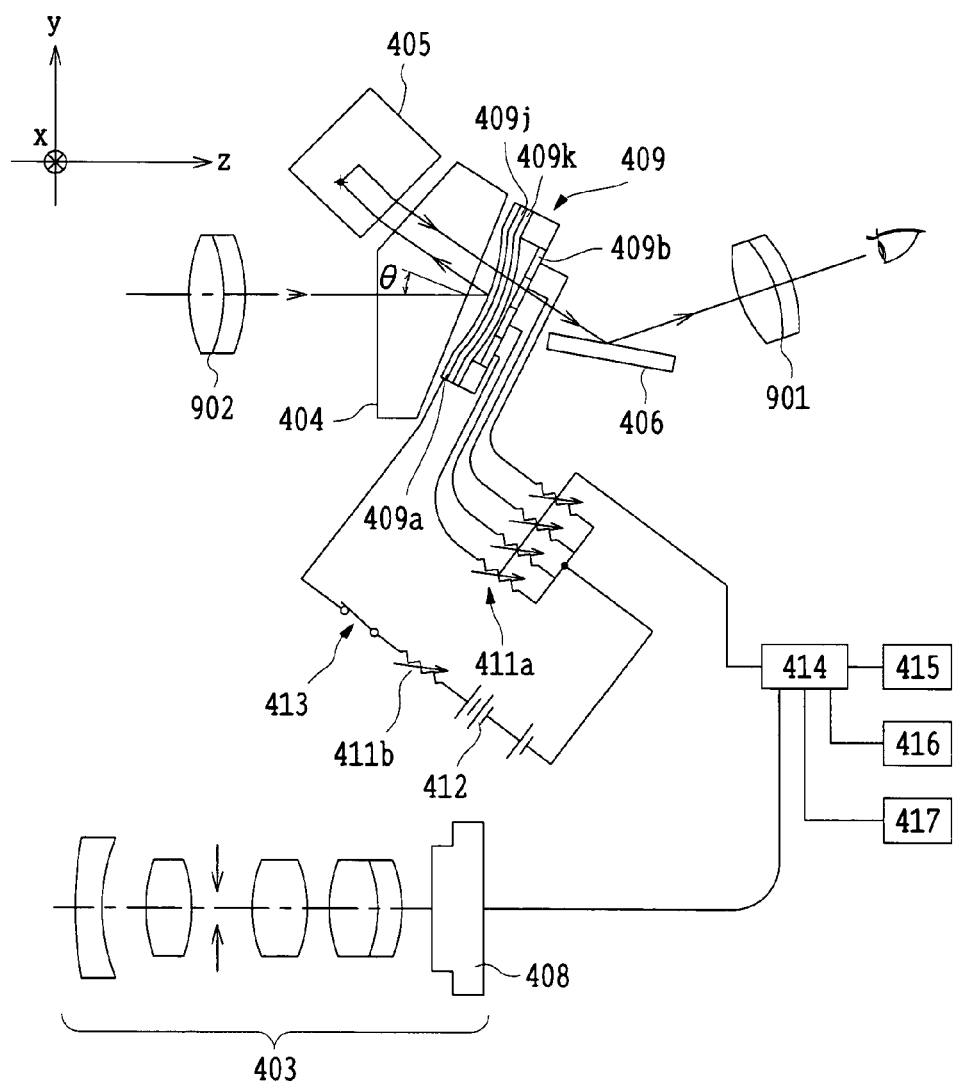
FIG. 9 is a view showing schematically the imaging optical system to which a deformable mirror is applied.

FIG. 9 shows a Keplerian finder for a digital camera used as the optical apparatus of the present invention, that is, in the case where the deformable mirror is applied to an observation optical system. The deformable mirror can, of course, be used in the observation optical system of a silver halide film camera. Reference is first made to a variable optical-property mirror 409.

The variable optical-property mirror 409 refers to a variable optical-property deformable mirror (which is hereinafter simply called the deformable mirror) in which the periphery of the deformation layer of a three-layer structure including an electrode 409k, a deformable substrate 409j, and a thin film (reflecting surface) 409a coated with aluminum and functioning as a reflecting surface, provided on the substrate 409j, is fixed on a support 423, and in which a plurality of electrodes 409b spaced with respect to the electrode 409k are fixed below the support 423. Reference numeral 411a denotes a plurality of variable resistors connected to the electrodes 409b; 412 denotes a power supply connected between the thin film 409a and the electrodes 409b through the variable resistors 411 and a power switch 413; 414 denotes an arithmetical unit for controlling the resistance values of the plurality of variable resistors 411; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror 409 need not necessarily be planar, and may have any shape such as a spherical or rotationally symmetrical aspherical surface; a spherical, planar, or rotationally symmetrical aspherical surface which has decentration with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface. Also, the decentration refers to either the displacement (shift) or the tilt, or both.

Figure 11:
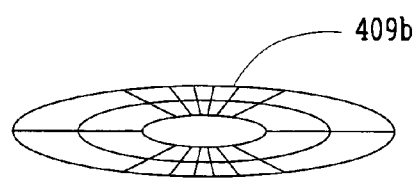
FIG. 11 is an explanatory view showing one aspect of electrodes used in the deformable mirror of FIG. 10.
Figure 12:
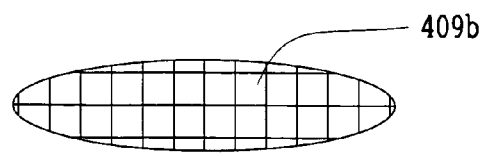
FIG. 12 is an explanatory view showing another aspect of electrodes used in the deformable mirror of FIG. 10.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when voltages are applied between the electrode 409k and the plurality of electrodes 409b, the thin film 409a is deformed by the electrostatic force and its surface profile is changed. Whereby, not only can focusing be adjusted to the diopter of an observer, but it is also possible to suppress deformations and changes of refractive indices, caused by temperature and humidity changes of the lenses 902 and 901 and/or the prism 404, the isosceles rectangular prism 405, and the mirror 406, or the degradation of imaging performance by the expansion and deformation of a lens frame and assembly errors of parts, such as optical elements and frames. In this way, a focusing adjustment and correction for aberration produced by the focusing adjustment can be always properly made. Also, it is only necessary that the profile of the electrodes 409b, for example, as shown in FIG. 11 or 12, is selected in accordance with the deformation of the thin film 409a so as to have a concentric division pattern or a rectangular division pattern When the deformable mirror 409 is used, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 9, a mark + on the optical path indicates that a ray of light travels toward the back side of the plane of the page), and is reflected by the mirror 406 to enter the eye through the eyepiece 901. As mentioned above, the lenses 901 and 902, the prisms 404 and 405, and the deformable mirror 409 constitute the observation optical system of the optical apparatus of the present invention. The surface profile and thickness of each of these optical elements are optimized and thereby aberration of an object surface can be minimized.

Specifically, the configuration of the thin film 409a functioning as the reflecting surface is controlled in such a way that the resistance values of the variable resistors 411a are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411a so that voltages by which the configuration of the thin film 409a is determined are applied to the electrodes 409b. Thus, since the thin film 409a is deformed with the voltages applied to the electrodes 409b, that is, the electrostatic forces, it assumes various shapes including an aspherical surface, according to circumstances. The range sensor 417 need not necessarily be used, and in this case, it is only necessary that an imaging lens 403 for the imaging optical system of the digital camera is moved so that a high-frequency component of an image signal from a solid-state image sensor 408 is roughly maximized, and the object distance is calculated from this position so that an observer's eye is able to focus upon the object image by deforming the deformable mirror.

When the deformable substrate 409j is made of synthetic resin, such as polyimide, it can be considerably deformed even at a low voltage, which is advantageous. Also, the prism 404 and the deformable mirror 409 can be integrally configured into a unit. Also, although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the above description, the lenses 901 and 902 are arranged separately from the prism 404. However, if the prisms 404 and 405, the mirror 406, and the deformable mirror 409 are designed so that aberration can be eliminated without providing the lenses 902 and 901, the prisms 404 and 405 and the deformable mirror 409 will be configured as one optical block, and the assembly is facilitated. Parts or all of the lenses 902 and 901, the prisms 404 and 405, and the mirror 406 may be made of glass. By doing so, an observation optical system with a higher degree of accuracy is obtained. It is desirable that the profile of the reflecting surface of the deformable mirror is controlled to be the free-formed surface. This is because correction for aberration is facilitated, which is advantageous.

Also, although in FIG. 9 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

EXAMPLE 2 OF DEFORMABLE MIRROR

Figure 10:
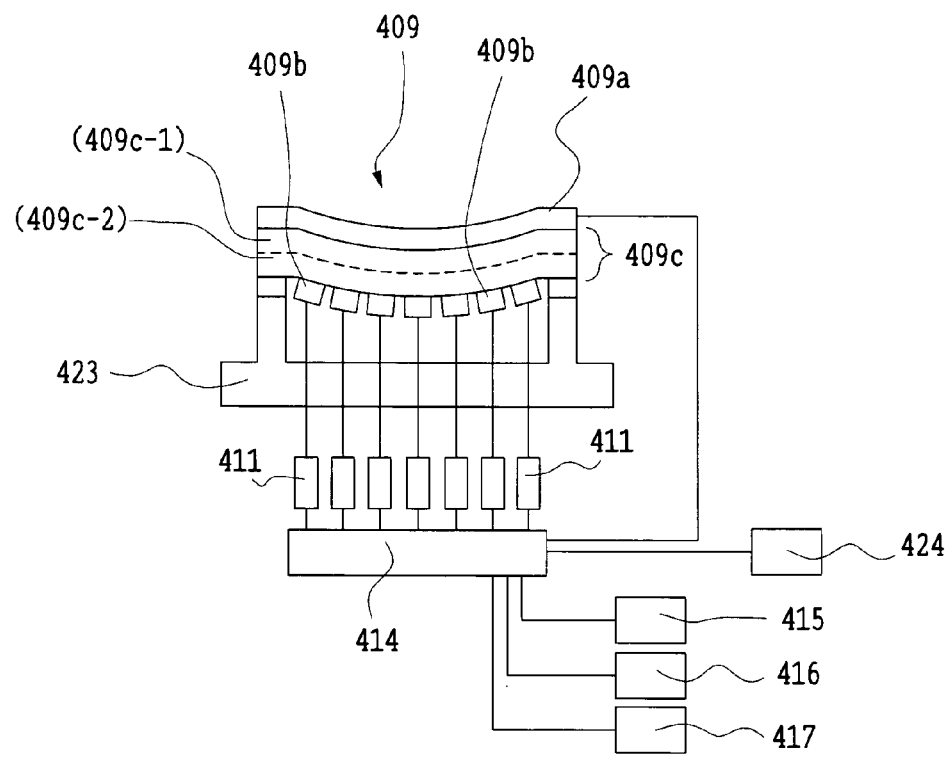
FIG. 10 is a view showing schematically another example of the deformable mirror.

FIG. 10 shows another example of the deformable mirror 409. In the deformable mirror of this example, a piezoelectric element 409c is interposed between the thin film 409a and the electrodes 409b, and these are placed on the support 423. A voltage applied to the piezoelectric element 409c is changed in accordance with each of the electrodes 409b, and thereby the piezoelectric element 409c causes expansion and contraction which are partially different so that the shape of the thin film 409a can be changed. The configuration of the electrodes 409b, as illustrated in FIG. 11, may have a concentric division pattern, or as in FIG. 12, may be a rectangular division pattern. As other patterns, proper configurations can be chosen.

In FIG. 10, reference numeral 424 represents a shake sensor connected to the arithmetical unit 414. The shake sensor 424, for example, detects the shake of a digital camera in photography and changes the voltages applied to the electrodes 409b through the arithmetical unit 414 and the variable resistors 411 in order to deform the thin film (reflecting surface) 409a so as to compensate for the blurring of an image caused by the shake. At this time, signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength. Also, the piezoelectric element 409c may have a two-layer structure, such as layers 409c-1 and 409c-2, to be described later, depending on material used.

EXAMPLE 3 OF DEFORMABLE MIRROR

Figure 13:
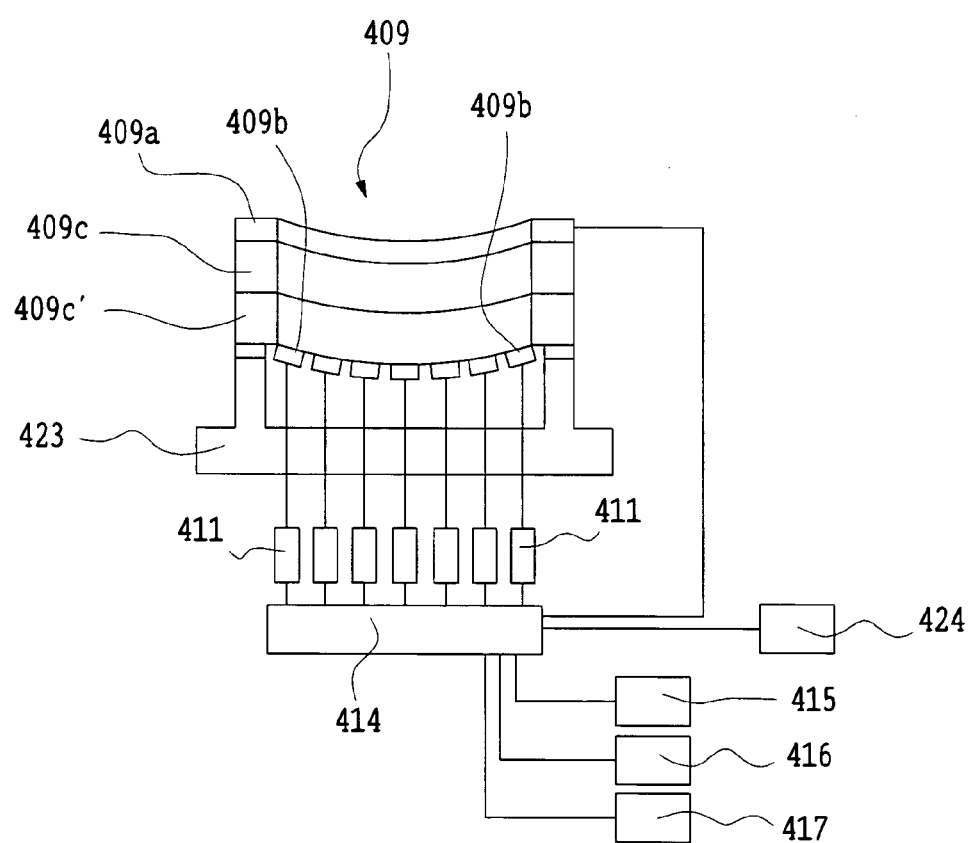
FIG. 13 is a view showing schematically another example of the deformable mirror.

FIG. 13 shows still another example of the deformable mirror 409. This example has the same construction as the deformable mirror of FIG. 10 with the exception that two piezoelectric elements 409c and 409c' are interposed between the thin film 409a and the electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in reverse directions when voltages are applied, and thus there is the advantage that a force for deforming the thin film (reflecting surface) 409a becomes stronger than in the example of FIG. 10, and as a result, the shape of the mirror surface can be considerably changed. Other reference numerals of FIG. 13 are the same as in FIG. 10.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When these piezoelectric elements are used, it is also possible to properly deform the thin film 409a in each of the above examples if their thicknesses are made uneven.

As materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used. The use of an organic substance, synthetic resin, or elastomer, having a piezoelectric property, brings about a considerable deformation of the surface of the deformable mirror, which is favorable.

When an electrostrictive substance, for example, acrylic elastomer or silicon rubber, is used for the piezoelectric element 409c shown in FIGS. 10 and 13, the piezoelectric element 409c, as indicated by a broken line in FIG. 11, may have the two-layer structure in which the substrate 409c-1 is cemented to the electrostrictive substance 409c-2.

EXAMPLE 4 OF DEFORMABLE MIRROR

Figure 14:
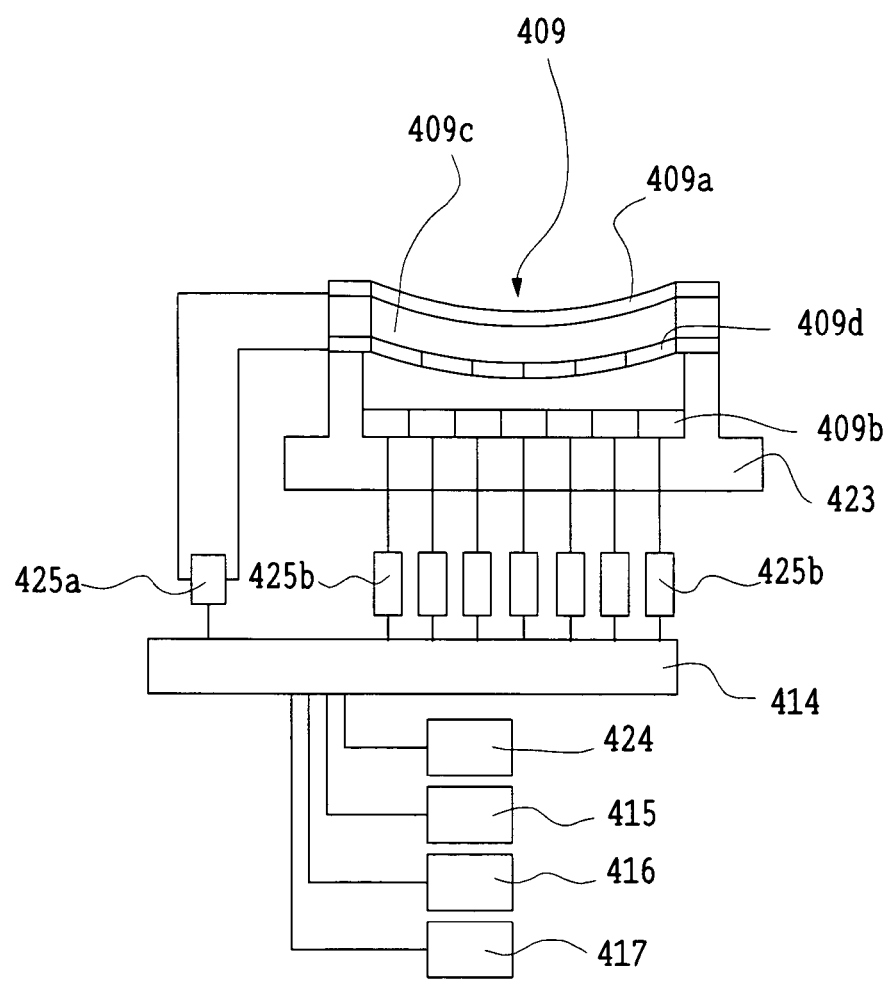
FIG. 14 is a view showing schematically another example of the deformable mirror.

FIG. 14 shows another example of the deformable mirror 409. The deformable mirror of this example is designed so that the piezoelectric element 409c is sandwiched between the thin film 409a and a plurality of electrodes 409d, and these are placed on the support 423. Voltages are applied to the piezoelectric element 409c between the thin film 409a and the electrodes 409d through a driving circuit 425a controlled by the arithmetical unit 414. Furthermore, apart from this, voltages are also applied to the plurality of electrodes 409b provided on a bottom surface inside the support 423, through driving circuits 425b controlled by the arithmetical unit 414. Therefore, the thin film 409a can be doubly deformed by electrostatic forces due to the voltages applied between the thin film 409a and the electrodes 409d and applied to the electrodes 409b. There are advantages that various deformation patterns can be provided and the response is quick, compared with any of the above examples. Other reference numerals of FIG. 14 are the same as in FIG. 10.

By changing the signs of the voltages applied between the thin film 409a and the electrodes 409d, the thin film 409a of the deformable mirror 409 can be deformed into either a convex or concave surface. In this case, a considerable deformation may be performed by a piezoelectric effect, while a slight shape change may be carried out by the electrostatic force. Alternatively, the piezoelectric effect may be chiefly used for the deformation of the convex surface, while the electrostatic force may be used for the deformation of the concave surface. Also, the electrodes 409d may be constructed as a single electrode or a plurality of electrodes like the electrodes 409b. The aspect of the electrodes 409d constructed as the plurality of electrodes is shown in FIG. 14. In the description, all of the piezoelectric effect, the electrostrictive effect, and electrostriction are generally called the piezoelectric effect. Thus, it is assumed that the electrostrictive substance comes into the category of the piezoelectric substance.

EXAMPLE 5 OF DEFORMABLE MIRROR

Figure 15:
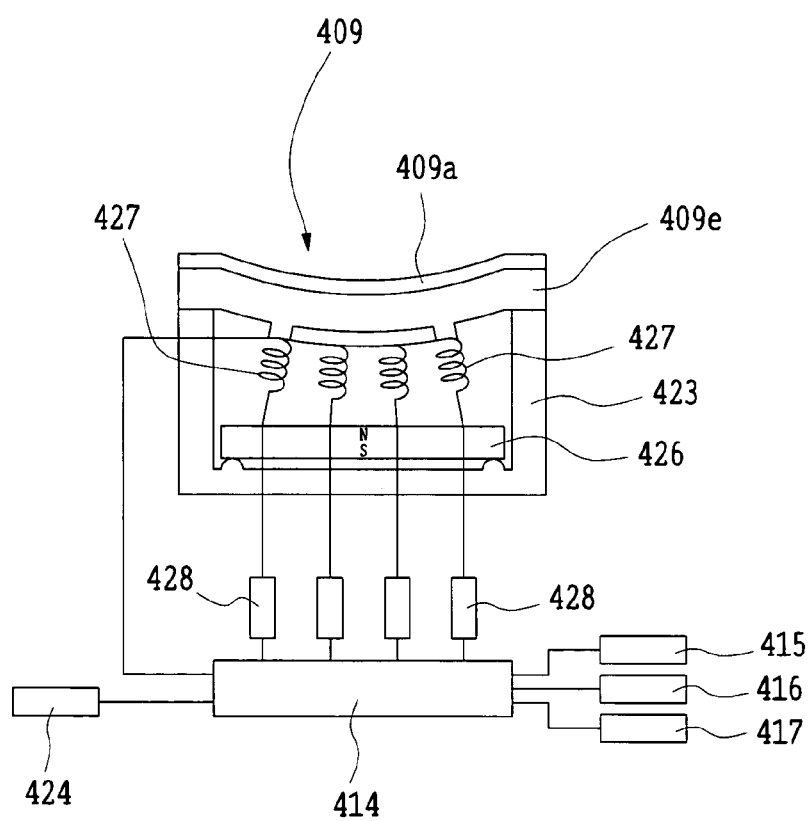
FIG. 15 is a view showing schematically another example of the deformable mirror.

FIG. 15 shows another example of the deformable mirror 409. The deformable mirror of this example is designed so that the shape of the reflecting surface can be changed by utilizing an electromagnetic force. A permanent magnet 426 is fixed on the bottom surface inside the support 423, and the periphery of a substrate 409e made with silicon nitride or polyimide is mounted and fixed on the top surface thereof. The thin film 409a with the coating of metal, such as aluminum, is deposited on the surface of the substrate 409e, thereby constituting the deformable mirror 409. On the lower surface of the substrate 409e, a plurality of coils 427 are fixedly mounted and connected to the arithmetical unit 414 through driving circuits 428. Other reference numerals of FIG. 15 are the same as in FIG. 10. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409e and the thin film 409a.

In this case, a different amount of current can also be caused to flow through each of the coils 427. A single coil 427 may be used. The permanent magnet 426 may be mounted on the lower surface of the substrate 409e so that the coils 427 are arranged on the bottom surface inside the support 423. It is desirable that the coils 427 are made as thin film coils by a lithography process. A ferromagnetic iron core may be encased in each of the coils 427.

Figure 16:
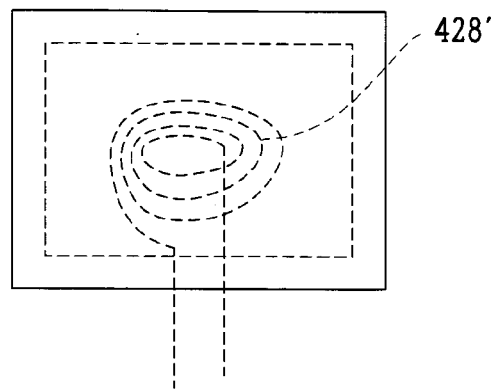
FIG. 16 is an explanatory view showing the winding density of a thin-film coil in the example of FIG. 15.

In the case of the thin film coils, each of the thin film coils 427, as illustrated in FIG. 16, can be designed as a coil 428' that a coil density varies with the place of the lower surface of the substrate 409e, and thereby a desired deformation is brought to the substrate 409e and the thin film 409a. A single coil 427 may be used, or a ferromagnetic iron core may be encased in each of the coils 427.

EXAMPLE 6 OF DEFORMABLE MIRROR

Figure 17:
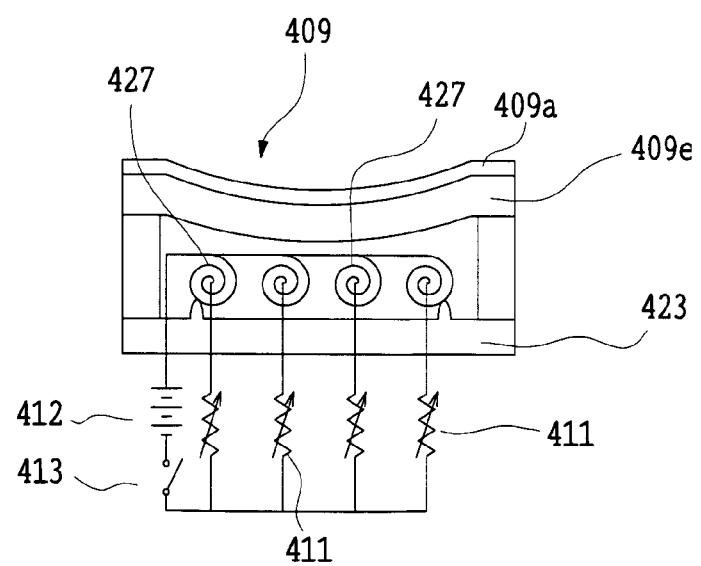
FIG. 17 is a view showing schematically another example of the deformable mirror.

FIG. 17 shows another example of the deformable mirror 409. Other reference numerals are the same as in FIG. 10. In the deformable mirror of this example, the substrate 409e is made with a ferromagnetic such as iron, and the thin film 409a as a reflecting film is made with aluminum. The peripheral edge of the substrate 409e is mounted and fixed on the top surface of the support 423. The coils 427 are fixed on the bottom side inside the support 423. In this case, since the thin film coils need not be provided beneath the substrate 409e, the structure is simple and the manufacturing cost can be reduced. If the power switch 413 is replaced with a changeover and power on-off switch, the directions of currents flowing through the coils 427 can be changed, and the configurations of the substrate 409e and the thin film 409a can be changed at will.

Figure 18:
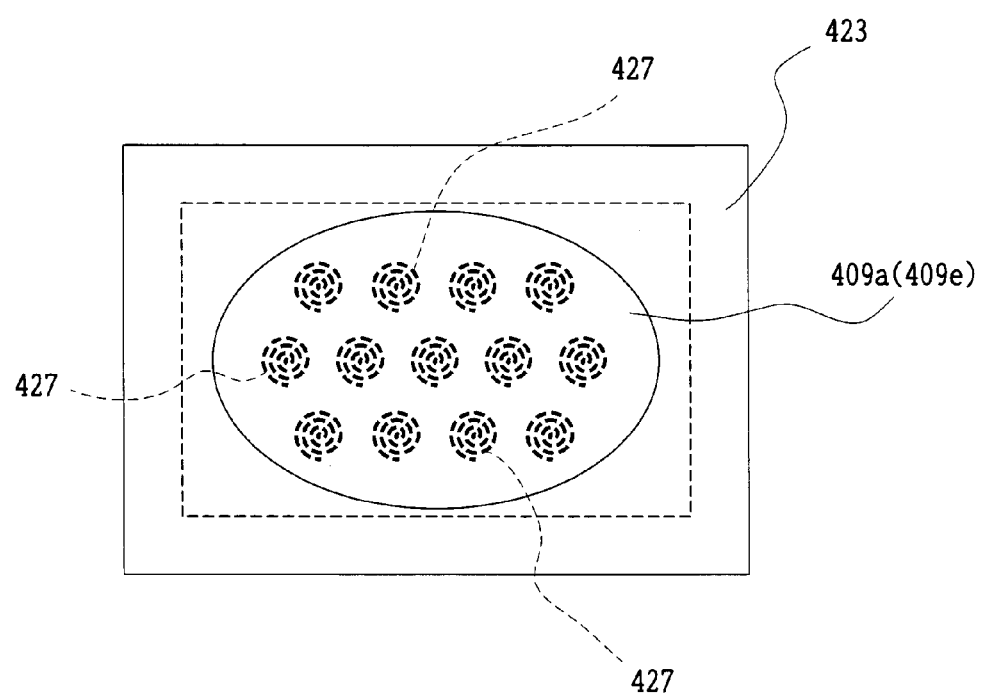
FIG. 18 is an explanatory view showing one example of an array of coils in the example of FIG. 17.
Figure 19:
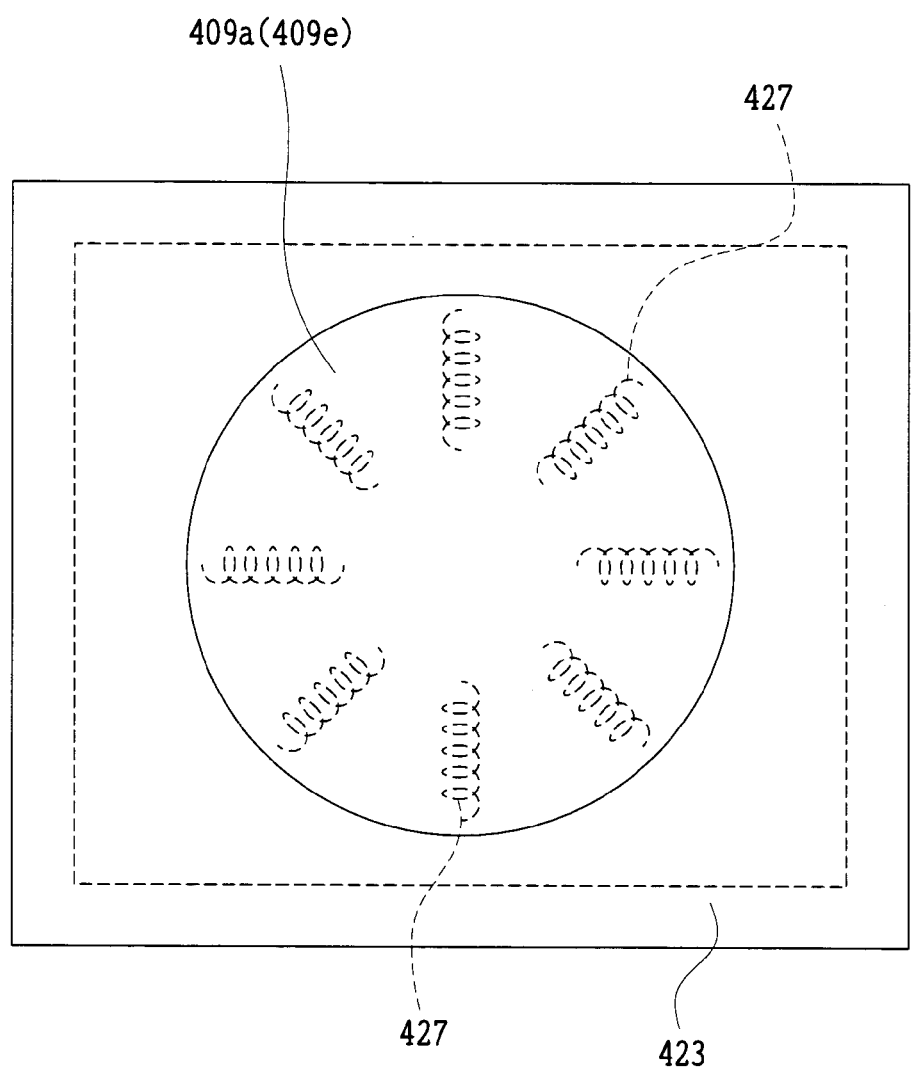
FIG. 19 is an explanatory view showing another example of the array of coils in the example of FIG. 17.
Figure 20:
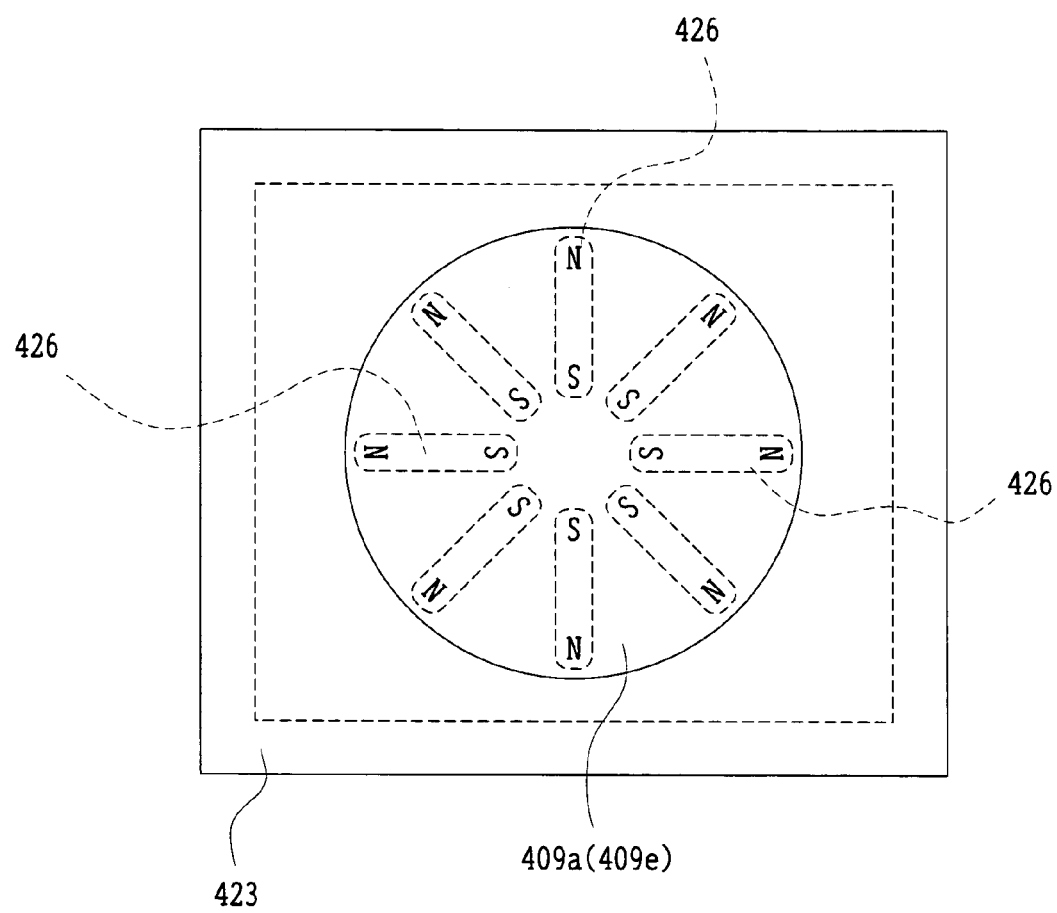
FIG. 20 is an explanatory view showing an array of permanent magnets suitable for the array of coils of FIG. 19 in the example of FIG. 15.

FIG. 18 shows an example of an array of the coils 427 provided with respect to the thin film 409a and substrate 409e. FIG. 19 shows another example of the array of the coils 427. These arrays are also applicable to the example of FIG. 15. FIG. shows an array of the permanent magnets 426 suitable for the case where the coils 427 are radially arrayed as in FIG. 19. Specifically, when the bar-shaped permanent magnets 426, as shown in FIG. 20, are radially arrayed, a delicate deformation can be provided to each of the substrate 409e and the thin film 409a in contrast with the example of FIG. 15. As mentioned above, when the electromagnetic force is used to deform the substrate 409e and the thin film 409a (in the examples of FIGS. 15 and 17), there is the advantage that they can be driven at a lower voltage than in the case where the electrostatic force is used.

Some examples of the deformable mirrors have been described, but as shown in the example of FIG. 14, at least two kinds of forces may be used in order to change the shape of the thin film mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

EXAMPLE 7 OF DEFORMABLE MIRROR

Figure 21:
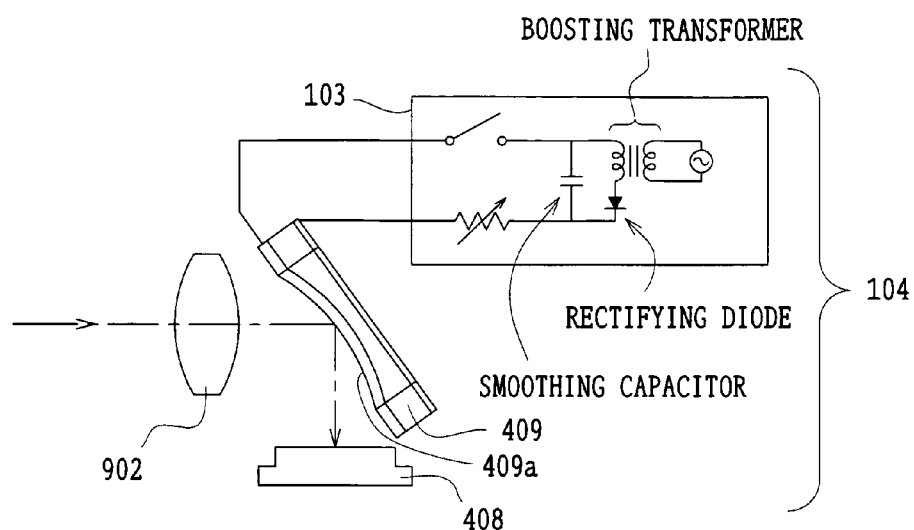
FIG. 21 is a view showing schematically an imaging optical system which uses the deformable mirror applicable to the optical apparatus of the present invention and is used, for example, in a digital camera of a mobile phone, a capsule endoscope, an electronic endoscope, a digital camera for personal computers, or a digital camera for PDAs.

FIG. 21 shows the imaging optical system of the optical apparatus which uses the deformable mirror 409, for example, a digital camera of a mobile phone, a capsule endoscope, an electronic endoscope, a digital camera for personal computers, or a digital camera for PDAs.

In the imaging optical system of this example, one imaging unit 104, that is, one optical apparatus, is constructed with the deformable mirror 409, the lens 902, the solid-state image sensor 408, and a control system 103. The imaging unit 104 of this example is designed so that light from an object passing through the lens 902 is condensed when reflected by the thin film (reflecting surface) 409a of the deformable mirror 409, and is imaged on the solid-state image sensor 408. The deformable mirror 409 is a kind of variable optical-property element and is also referred to as a variable focal-length mirror.

According to this example, even when the object distance is changed, the reflecting surface 409a of the deformable mirror 409 is deformed and thereby the object can be brought into a focus. The example need not move the lens 902 by using a motor and excels in compact and lightweight design and low power consumption. The imaging unit 104 can be used in any of the examples as the imaging optical system of the present invention. When a plurality of deformable mirrors 409 are used, an optical system, such as a zoom imaging system or a variable magnification imaging system, can be constructed.

In FIG. 21, an example of a control system is cited which includes the boosting circuit of a transformer using coils in the control system 103. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

EXAMPLE 8 OF DEFORMABLE MIRROR

Figure 22:
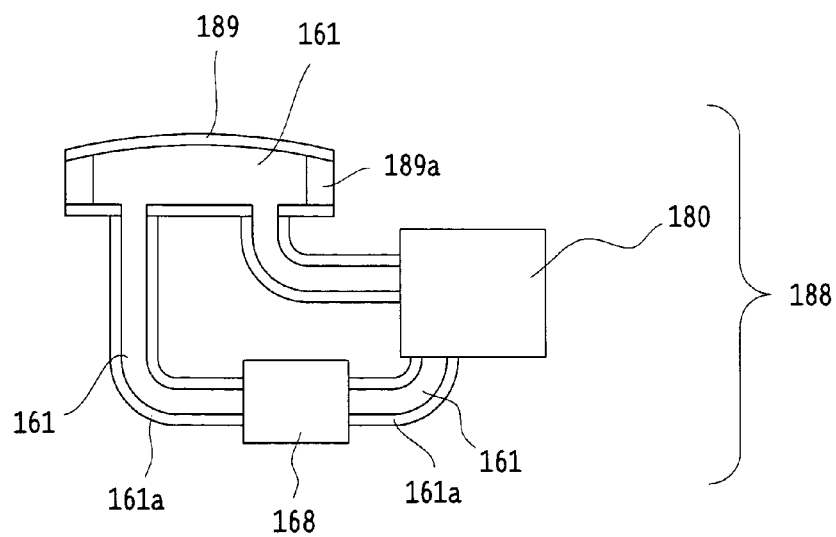
FIG. 22 is a view showing schematically the deformable mirror in which a fluid is taken in and out by a micropump to deform a lens surface.

FIG. 22 shows another example of the deformable mirror. In FIG. 22, a deformable mirror 188 is constructed so that a fluid 161 in a pipe line 161a is taken in and out by a micropump 180 to deform a mirror surface which is the surface of a reflecting film 189 provided on a support 189a. According to this example, there is the merit that the mirror surface can be considerably deformed. A liquid tank 168 is provided midway of the pipe line connecting the support 189a and the micropump 180 so that a preset amount of fluid 161 can be fed inside the support 189a.

The micropump 180 is a small-sized pump, for example, made by a micro-machining technique and is constructed so that it is operated with an electric power. As examples of pumps made by the micromachining technique, there are those which use thermal deformations, piezoelectric substances, and electrostatic forces.

Figure 23:
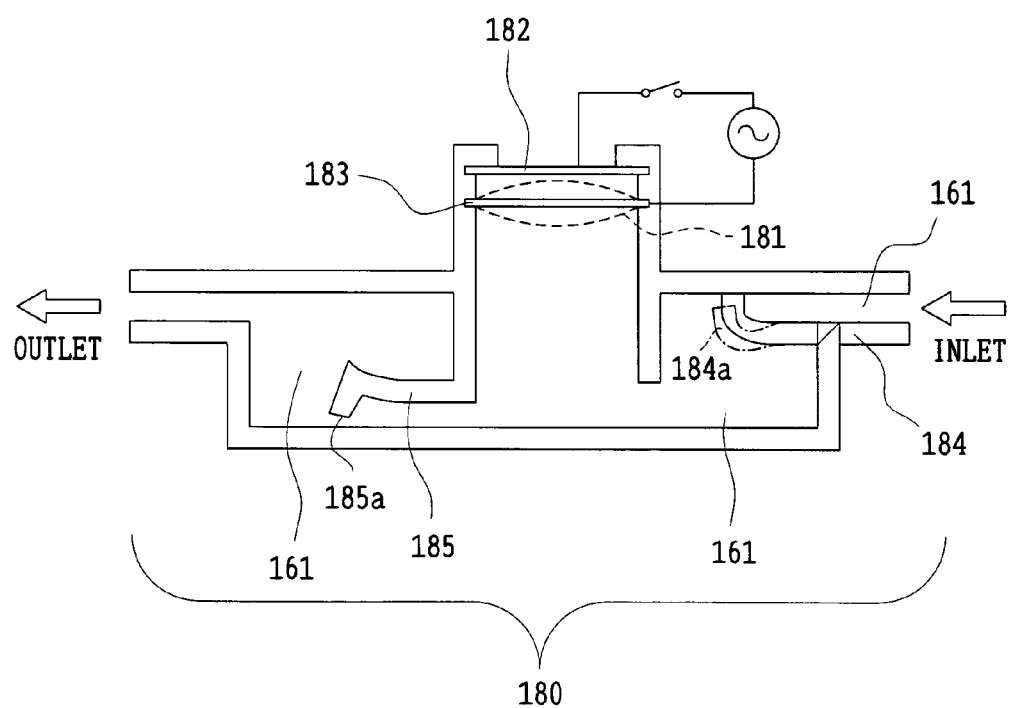
FIG. 23 is a view showing schematically one example of the micropump applicable to the deformable mirror.

FIG. 23 shows the micropump 180. In the micropump 180, a vibrating plate 181 that the fluid 161 is taken in and out is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, tops 184a and 185a of two valves 184 and 185 are opened and closed to feed the fluid 161 from the right to the left.

In the deformable mirror 188 of FIG. 22, the reflecting film 189 is deformed into a concave or convex shape in accordance with the amount of the fluid 161, and thereby the surface of the reflecting film 189 functions as the deformable mirror. The deformable mirror 188 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 21, it is desirable that the boosting transformer or the piezoelectric transformer is used to constitute the control system.

In the thin film 409a for reflection or the reflecting film 189, when the periphery fixed on the support 423 or 189a is provided as a portion which is not deformed, it can be used as a reference surface where the profile of the deformable mirror is measured by an interferometer, which is convenient.

EXAMPLE OF VARIABLE FOCAL-LENGTH LENS

Figure 24:
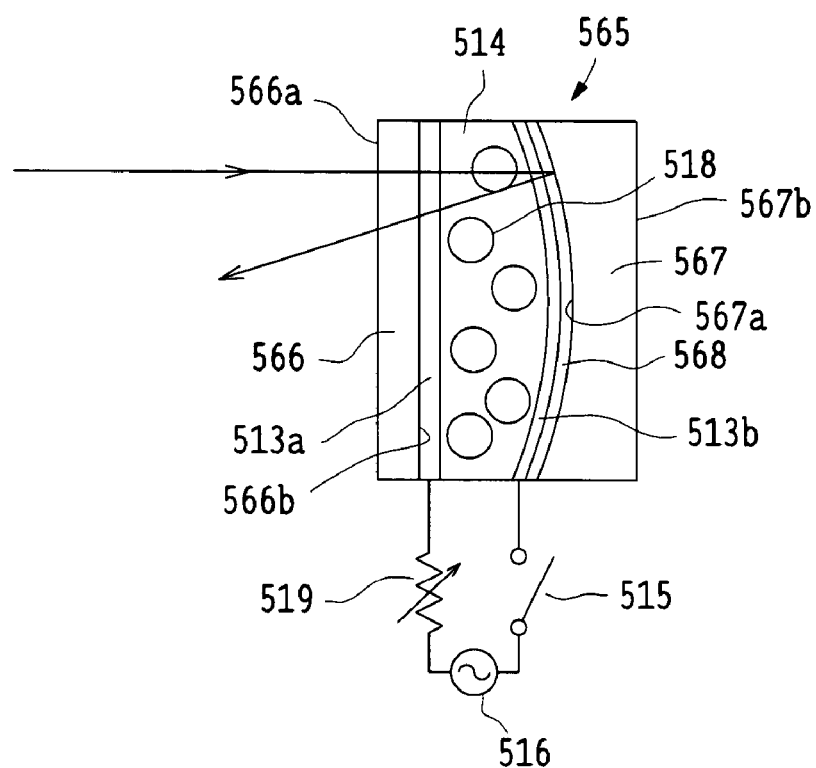
FIG. 24 is a view showing an example of a variable focal-length mirror functioning as a variable focal-length lens.

FIG. 24 shows an example where a variable focal-length lens is used as a variable focal-length mirror. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide a transparent electrode 513a on the inner surface (the second surface) 566b. The second transparent substrate 567 is such that the inner surface (the third surface) 567a is configured as a concave surface, on which a reflecting film 568 is deposited, and a transparent electrode 513b is provided on the reflecting film 568. Between the transparent electrodes 513a and 513b, a macromolecular dispersed liquid crystal layer 514 is sandwiched, and the transparent electrodes 513a and 513b are connected to an alternating-current power supply 516 through a switch 515 and a variable resistor 519 so that an alternating-current voltage is applied to the macro-molecular dispersed liquid crystal layer 514. Also, in FIG. 24, liquid crystal molecules are omitted.

According to the above structure, since a ray of light incident from the side of the transparent substrate 566 is reflected back by the reflecting film (reflecting surface) 568 and is passed again through the liquid crystal layer 514, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, the conditions mentioned above can be used. Moreover, the inner surface of the transparent substrate 566 or 567 can also be configured into a diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current voltage to the liquid crystal layer. However, a direct-current power supply is used and thereby a direct-current voltage can also be applied to the liquid crystal layer. Techniques of shifting the orientation of the liquid crystal molecules, in addition to changing the voltage, can be achieved by changing the frequency of the electric field applied to the liquid crystal layer, the strength and/or frequency of the magnetic field applied to the liquid crystal layer, or the temperature of the liquid crystal layer. Also, in the present invention, it is assumed that the variable focal-length mirror whose shape is not changed, such as that shown in FIG. 24, comes into the category of the deformable mirror.

The merits of the optical element whose focal length is changed by altering the refractive index of a medium constituting the macromolecular dispersed liquid crystal layer, such as that described in FIG. 24, are that a mechanical design is easy and a mechanical structure is simplified because the shape is not changed.

EXAMPLE 9 OF DEFORMABLE MIRROR

Figure 25:
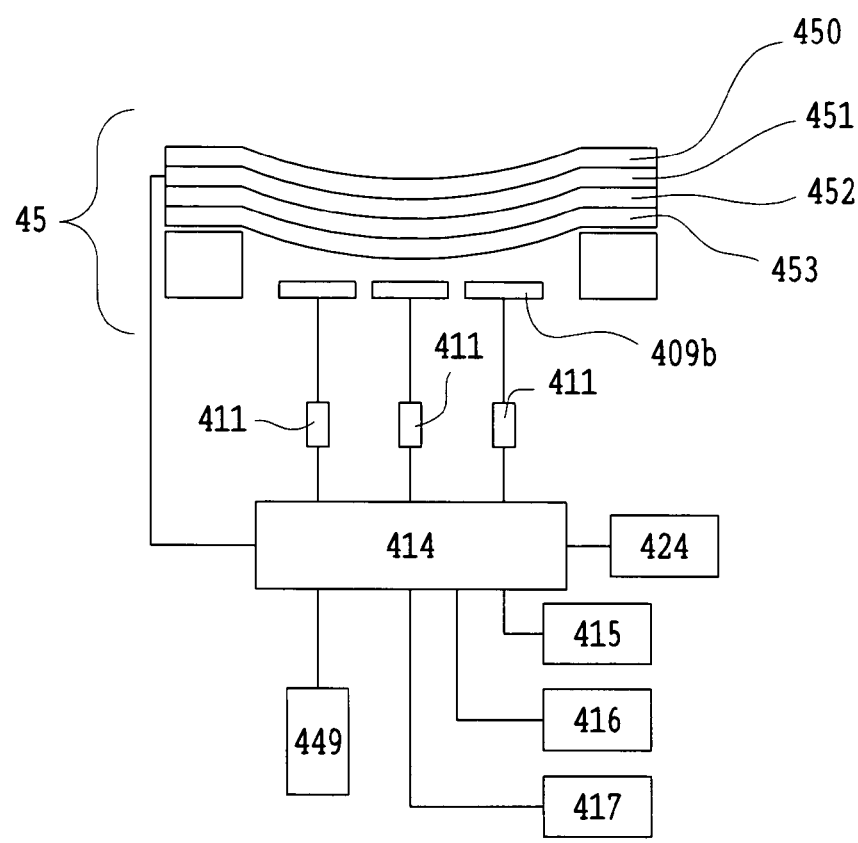
FIG. 25 is a view showing schematically another example of the deformable mirror.

FIG. 25 shows another example of the deformable mirror. This example is described on the assumption that the deformable mirror is used in the digital camera. Again, in FIG. 25, reference numeral 411 designates the variable resistors; 414, the arithmetical unit; 415, the temperature sensor; 416, the humidity sensor; 417, the range sensor; and 424, the shake sensor.

A deformable mirror 45 of the example is constructed so that a plurality of divided electrodes 409b are spaced away from an electrostrictive substance 453 including an organic substance such as acrylic elastomer, on which an electrode 452 and a deformable substrate 451 are placed in turn, and a reflecting film 450 of metal, such as aluminum, for reflecting incident light is provided on the substrate 451. Thus, the deformable mirror 45 has a four-layer structure for deformation.

The deformable mirror, when constructed as mentioned above, has the merit that the surface profile of the reflecting film (reflecting surface) 450 becomes smooth and it is hard to optically produce aberration, in contrast to the case where the divided electrodes 409b and the electrostrictive substance 453 are integrally constructed. Also, the deformable substrate 451 and the electrode 452 may be arranged in reverse order.

In FIG. 25, reference numeral 449 represents a button for changing the magnification of the optical system or for zooming. The deformable mirror 45 is controlled through the arithmetical unit 414 so that a user pushes the button 449 and thereby the reflecting film 450 can be deformed to change the magnification or zoom.

Also, instead of the electrostrictive substance including an organic substance such as acrylic elastomer, the piezoelectric substance such as barium titanate, already mentioned, may be used.

Also, although what follows is said in common with the deformable mirrors mentioned above, it is desirable that the shape where the portion of deformation of the reflecting surface is viewed from a direction perpendicular to the reflecting surface is long along the direction of the plane of incidence of an axial ray, for example, elliptical, oval, or polygonal. This is because the deformable mirror is often used in a state where a ray of light is incident at a grazing angle. In order to suppress aberration produced in this case, it is desirable that the reflecting surface has a shape similar to ellipsoid of revolution, paraboloid of revolution, or hyperboloid of revolution. This s because it is desirable that in order to deform the reflecting surface of the deformable mirror into such a shape, the shape where the portion of deformation of the reflecting surface is viewed from a direction perpendicular to the reflecting surface is long along the direction of the incident plane of the axial ray.

Finally, the definitions of terms used in the present invention will be described.

The optical apparatus refers to an apparatus including an optical system or optical elements. The optical apparatus need not necessarily function by itself. That is, it may be thought of as a part of an apparatus. The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, and an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a mobile phone.

The illumination device includes, for example, a stroboscopic lamp for cameras, a headlight for cars, a light source for endoscopes, or a light source for microscopes.

The signal processing device refers to, for example, a mobile phone, a personal computer, a game machine, a read/write device for optical disks, or an arithmetic unit for optical computers.

Also, the optical system of the present invention is small in size and light in weight, and thus when the optical system is used in the electronic imaging device or the signal processing device, notably the digital camera or the imaging system of the mobile phone, a particular effect is brought about.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface is defined as follows:

Any shape such as a spherical, planar, or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. is satisfactory. Moreover, any surface which has some effect on light, such as a reflecting or refracting surface, is satisfactory. In the present invention, it is assumed that such a surface is generally referred as to the extended surface.

The variable optical-property element includes a variable focal-length lens, a deformable mirror, a deflection prism whose surface profile is changed, a variable angle prism, a variable diffraction optical element in which the function of light deflection is changed, namely a variable HOE, or a variable DOE. The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a mobile phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

The zoom optical system according to the present invention described above is applicable to a film camera, a digital camera, a TV camera, a camera for personal digital assistants, a monitoring camera, a robot's eye, and an electrical endoscope.

Also, in the above zoom optical system, the arrangement with the reflecting surface in the lens unit has been described, but when a zoom optical system with no reflecting surface is constructed with an optical element having a deformable surface, for example, the variable focal-length lens, the effects of compactness, cost reduction, power saving, and noiseless operation can be brought about. Moreover, a variable focal-length mirror with no deformable surface may be used in each of the above embodiments.

What is claimed is:

1. An imaging optical system for forming an image of an object, comprising:
   a first lens unit located at a most object-side position; and
   one or more second lens units interposed between the first lens unit and the image, at least one of the second lens units being moved along an optical axis,
   wherein the first lens unit includes, in order from an object side:
     at least one lens with negative refracting power;
     a deformable mirror; and
     at least one lens with positive refracting power,
   wherein focusing is performed by deformation of the deformable mirror, and
   wherein one of the following conditions is satisfied:

$0.1 < d1/fw < 10.0$ $0.1 < d2/fw < 10.0$ where d1 is a distance from an object-side lens surface adjacent to the deformable mirror to the deformable mirror, d2 is a distance from the deformable mirror to an image-side lens surface adjacent to the deformable mirror, and fw is a focal length of the imaging optical system at a wide-angle position.

2. An imaging optical system for forming an image of an object, comprising:
 a first lens unit located at a most object-side position; and
 one or more second lens units interposed between the first lens unit and the image, at least one of the second lens units being moved along an optical axis,
 wherein the first lens unit includes, in order from an object side:
  at least one lens with negative refracting power;
  a deformable mirror; and
  at least one lens with positive refracting power,
 wherein focusing is performed by deformation of the deformable mirror, and
 wherein the deformable mirror is placed so as to satisfy the following condition:

$$35° < \theta < 105°$$

where θ is a sum of an angle of incidence of an axial chief ray on the deformable mirror and an angle of emergence of the axial chief ray from the deformable mirror.

3. An imaging optical system comprising, in order from an object side;
 a first lens unit with negative refracting power;
 a second lens unit with positive refracting power;
 a third lens unit with negative refracting power;
 a fourth lens unit with positive refracting power; and
 a fifth lens unit,
 the second lens unit and the fourth lens unit being moved dependently along an optical axis and satisfying one of the following conditions:

$$0.1 < fG2/fw$$

$$0.1 < fG4/fw$$

where fG2 is a focal length of the second lens unit, fG4 is a focal length of the fourth lens unit, and fw is a focal length of the imaging optical system at a wide-angle position.

4. An imaging optical system according to claim 3, wherein the first lens unit has at least one reflecting optical element.

5. An imaging optical system according to claim 2, wherein one of the following conditions is satisfied:

$$0.1 < D2/fw < 10.0$$

where D1 is a distance from an object-side lens surface adjacent to the at least one reflecting optical element to the at least one reflecting optical element and D2 is a distance from the at least one reflecting optical element to an image-side lens surface adjacent to the at least one reflecting optical element.

* * * * *

UNITED STATES PATENT AND TRADEMARK OFFICE
CERTIFICATE OF CORRECTION

PATENT NO. : 7,009,782 B2
APPLICATION NO. : 10/813636
DATED : March 7, 2006
INVENTOR(S) : Kentaro Sekiyama Page 1 of 1

It is certified that error appears in the above-identified patent and that said Letters Patent is hereby corrected as shown below:

Col. 32, line 17
  replace "claim 2"
  with --claim 4--.

Col. 32, line 20
  insert --$0.1 < D1/fw < 10.0$--.
  move "$0.1 < D2/fw < 10.0$" to line 21.

Signed and Sealed this

Thirteenth Day of March, 2007

JON W. DUDAS
*Director of the United States Patent and Trademark Office*